(12) United States Patent
Bociort et al.

(10) Patent No.: US 7,714,307 B2
(45) Date of Patent: May 11, 2010

(54) METHOD OF DESIGNING A PROJECTION SYSTEM, LITHOGRAPHIC APPARATUS AND DEVICE MANUFACTURING METHOD

(75) Inventors: Florian Bociort, Delft (NL); Maarten van Turnhout, Rotterdam (NL); Oana Elena Marinescu, Delft (NL)

(73) Assignees: ASML Netherlands B.V., Veldhoven (NL); Technische Universiteit Delf, Delft (NL); Carl Zeiss SMT AG, Oberkochen (DE)

( * ) Notice: Subject to any disclaimer, the term of this patent is extended or adjusted under 35 U.S.C. 154(b) by 708 days.

(21) Appl. No.: 11/517,578

(22) Filed: Sep. 8, 2006

(65) Prior Publication Data

US 2007/0165296 A1 Jul. 19, 2007

Related U.S. Application Data

(60) Provisional application No. 60/715,181, filed on Sep. 9, 2005.

(51) Int. Cl.
*H01J 37/30* (2006.01)

(52) U.S. Cl. .................. 250/492.2; 359/290; 702/2

(58) Field of Classification Search .............. 250/492.2
See application file for complete search history.

(56) References Cited

U.S. PATENT DOCUMENTS

| | | | |
|---|---|---|---|
| 5,229,872 A | 7/1993 | Mumola | |
| 5,296,891 A | 3/1994 | Vogt et al. | |
| 5,500,736 A | 3/1996 | Koitabashi et al. | |
| 5,523,193 A | 6/1996 | Nelson | |
| 5,530,482 A | 6/1996 | Gove et al. | |
| 5,579,147 A | 11/1996 | Mori et al. | |
| 5,677,703 A | 10/1997 | Bhuva et al. | |

(Continued)

FOREIGN PATENT DOCUMENTS

JP 2005-116852 A 4/2005

(Continued)

OTHER PUBLICATIONS

G.W. Forbes and A.E.W. Jones, "Towards global optimization with adaptive simulated annealing", Proc. *SPIE* 1354, 144-151, 1991.

(Continued)

*Primary Examiner*—David A. Vanore
*Assistant Examiner*—Phillip A. Johnston
(74) *Attorney, Agent, or Firm*—Sterne, Kessler, Goldstein & Fox P.L.L.C.

(57) ABSTRACT

Optimization of a projection system is performed to obtain a starting configuration that is at a local minimum of the merit function or simply a previously known minimum system is used as the starting configuration. A zero-thickness meniscus lens is inserted at a surface in the local minimum starting configuration with N surfaces to construct a saddle point with Morse Index=1 having N+2 surfaces. The saddle point is perturbed and optimization is performed on both sides of the saddle, and the distances at the two surfaces that have been introduced are increased, to generate two new configurations, $m_1$ and $m_2$, that are new minima in the merit function. Each resulting configuration is output, e.g., as a table of parameters specifying the projection system or as a computer file for use in making an actual projection system.

21 Claims, 16 Drawing Sheets

U.S. PATENT DOCUMENTS

| | | | |
|---|---|---|---|
| 5,686,728 | A | 11/1997 | Shafer |
| 5,805,344 | A | 9/1998 | Sasaya et al. |
| 5,808,797 | A | 9/1998 | Bloom et al. |
| 5,982,553 | A | 11/1999 | Bloom et al. |
| 6,133,986 | A | 10/2000 | Johnson |
| 6,177,980 | B1 | 1/2001 | Johnson |
| 6,556,648 | B1 | 4/2003 | Bal et al. |
| 6,636,350 | B2 * | 10/2003 | Shafer et al. ............... 359/366 |
| 6,669,337 | B2 * | 12/2003 | Welk et al. ............... 351/169 |
| 6,687,041 | B1 | 2/2004 | Sandstrom |
| 6,747,783 | B1 | 6/2004 | Sandstrom |
| 6,795,169 | B2 | 9/2004 | Tanaka et al. |
| 6,806,897 | B2 | 10/2004 | Kataoka et al. |
| 6,811,953 | B2 | 11/2004 | Hatada et al. |
| 6,895,334 | B2 * | 5/2005 | Yabe ............... 702/2 |
| 2004/0012866 | A1 | 1/2004 | Mann et al. |
| 2004/0041104 | A1 | 3/2004 | Liebregts et al. |
| 2004/0130561 | A1 | 7/2004 | Jain |
| 2005/0007572 | A1 | 1/2005 | George et al. |

FOREIGN PATENT DOCUMENTS

| | | |
|---|---|---|
| WO | WO 98/33096 A1 | 7/1998 |
| WO | WO 98/38597 A2 | 9/1998 |
| WO | WO 98/38597 A3 | 9/1998 |
| WO | WO 03/075096 A2 | 9/2003 |

OTHER PUBLICATIONS

T.G.Kuper and T.I. Harris, "Global optimization for lens design—an emerging technology", Proc. SPIE 1780, 14-28, 1992.

K.E. Moore, "Algorithm for global optimization of optical systems based on genetic competition", Proc. SPIE 3780, 40-47, 1999.

M. Isshiki, H. Ono, K. Hiraga, J. Ishikawa, S. Nakadate, "Lens design: Global optimization with Escape Function", Optical Review (Japan), 6, 463-470, 1995.

F. Bociort, E. van Driel, A. Serebriakov, "Network of local minima in optical system optimization", *Optics Leters* 29(2), p. 189-191 (2004).

F. Bociort, E. van Driel, A. Serebriakov, "Network structure of the set of local minima in optical system optimization", Proc. *SPIE* 5174, p. 26-34 (2003).

E. van Driel, F. Bociort, and A. Serebriakov, "Topography of the merit function landscape in optical system design," Proc. *SPIE* 5249, 353-363 (2004).

F. Bociort, A. Serebriakov, and M. van Turnhout, "Saddle points in the merit function landscape of systems of thin lenses in contact", Proc. *SPIE* 5523, 174-184 (2004).

O. Marinescu and F. Bociort, "The network structure of the merit function space of EUV mirror systems", Proc. *SPIE* 5874, to be published (2005).

Marinescu and F. Bociort, "Saddle points in the merit function landscape of lithographic objectives", Proc. *SPIE* 5962, to be published (2005).

E.W. Weisstein, "Monkey Saddle" in *CRC concise encyclopedia of mathematics*, CRC Press, Boca Raton, (1999), (also available at Wolfram Web Resource http://mathworld.wolfram.com/MonkeySaddle.html).

G.S. Fulcher, "Telescope objective without spherical aberration for large apertures, consisting of four crown glass lenses", *JOSA* 37(1), p. 47-53 (1947).

D. Shafer, "Optical Design and the Relaxation Response", Proc. *SPIE* 0766, p. 2-9 (1987).

R.E. Fisher, "Spherical Aberration—some fascinating observations", Proc. *SPIE* 0766, p. 53-60 (1987).

F. Bociort, M. van Turnhout, "Generating saddle points in the merit function landscape of optical systems", Proc. SPIE 5962, 2005.

J.B. Caldwell, "All-fused silica 248-nm lithographic projection lens", *Optics and Photonics News* 9(11), 40-41, 1998.

Translation of Notice of Reasons for Rejection mailed Jan. 6, 2010 for Japanese Patent Application No. 2006-243024, 4 pgs.

\* cited by examiner

Fig. 2
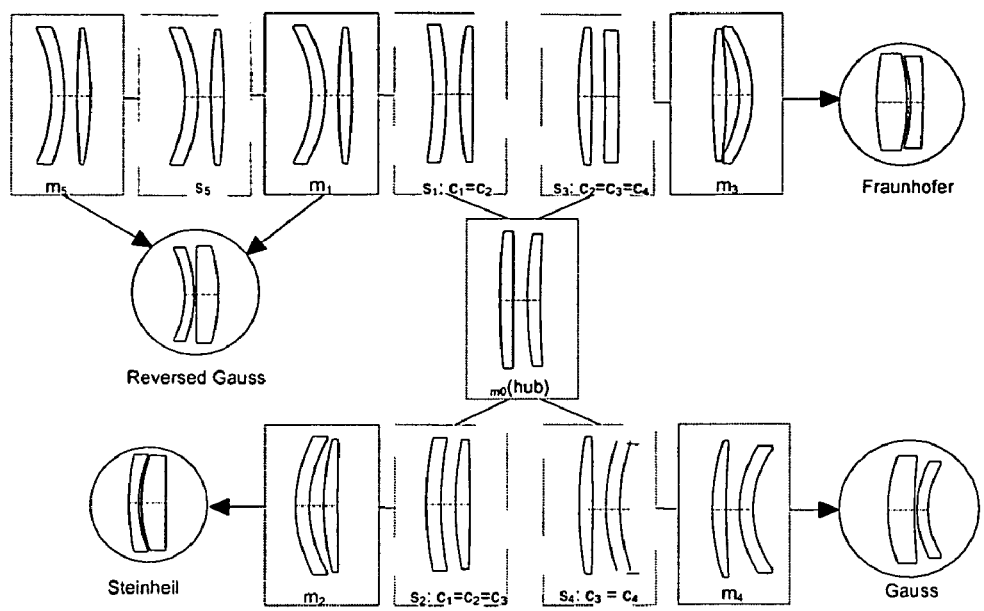
Fig. 3
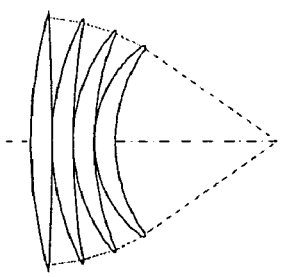
Fig. 4a    Fig. 4b    Fig. 4c    Fig. 4d
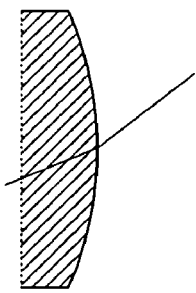 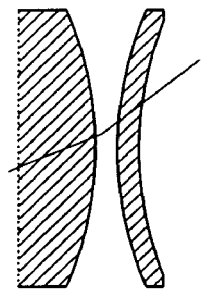 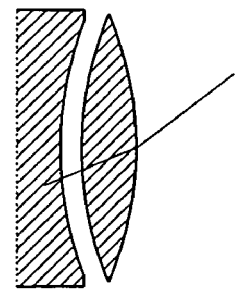 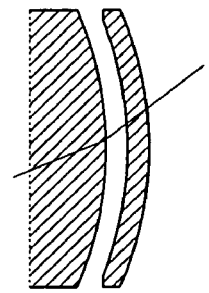

S34  S39

[Changes due to lens extraction]

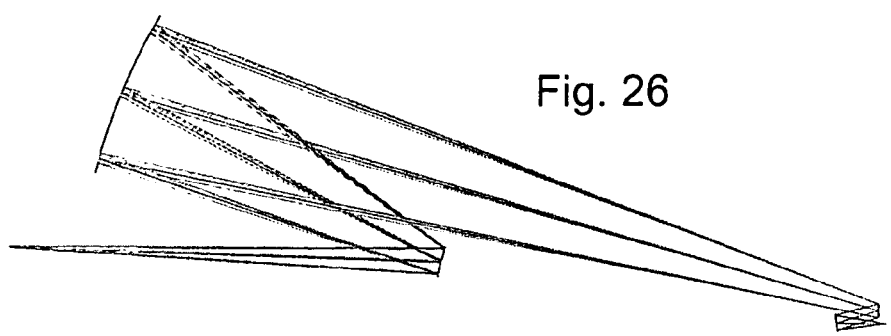
Fig. 26
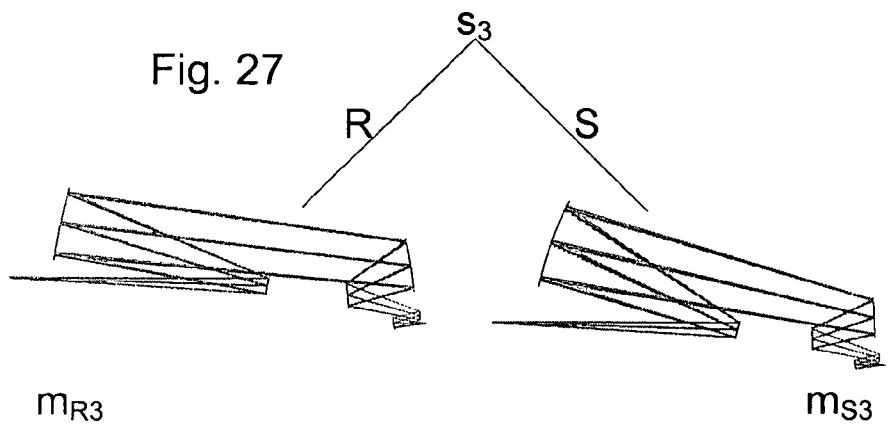
Fig. 27
$s_3$
R  S
$m_{R3}$  $m_{S3}$
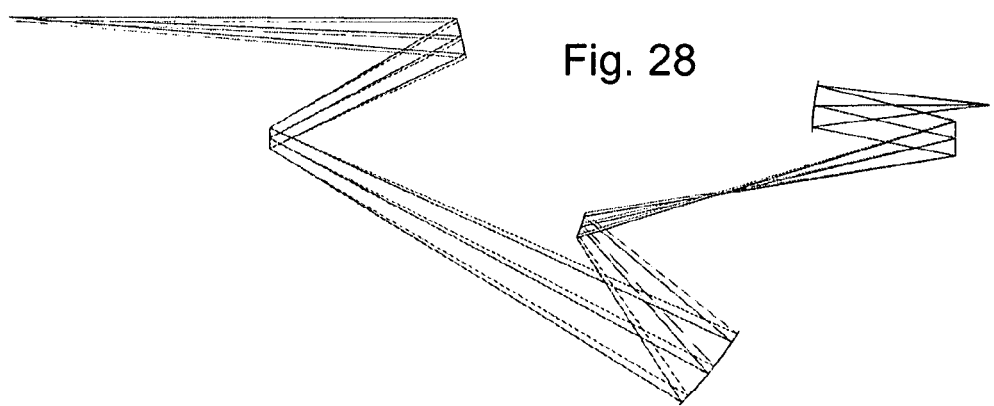
Fig. 28
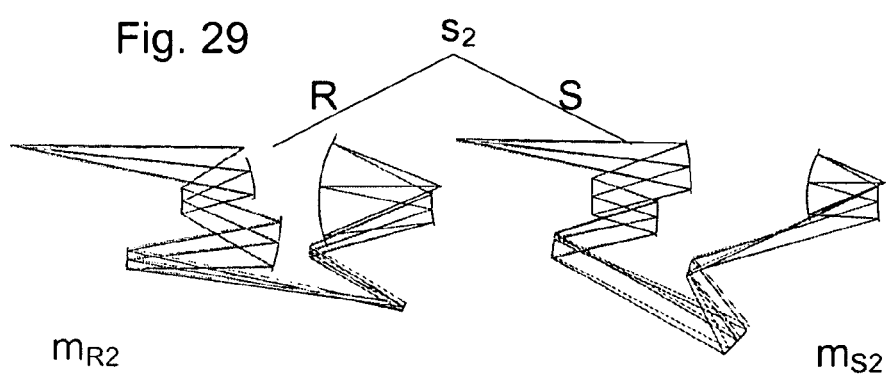
Fig. 29  $s_2$
R  S
$m_{R2}$  $m_{S2}$

METHOD OF DESIGNING A PROJECTION SYSTEM, LITHOGRAPHIC APPARATUS AND DEVICE MANUFACTURING METHOD

CROSS REFERENCE TO RELATED APPLICATIONS

This application claims benefit under 35 U.S.C. §119(e) to U.S. Provisional Patent Application No. 60/715,181, filed Sep. 9, 2005, which is incorporated by reference herein in its entirety.

BACKGROUND

1. Field

The present invention relates to a method of designing a projection system, a lithographic apparatus and a method for manufacturing a device.

2. Related Art

A lithographic apparatus is a machine that applies a desired pattern onto a substrate, usually onto a target portion of the substrate. A lithographic apparatus can be used, for example, in the manufacture of integrated circuits (ICs). In that instance, a patterning device, which is alternatively referred to as a mask or a reticle, can be used to generate a circuit pattern to be formed on an individual layer of the IC. This pattern can be transferred onto a target portion (e.g., comprising part of, one, or several dies) on a substrate (e.g., a silicon wafer). Transfer of the pattern is typically via imaging onto a layer of radiation-sensitive material (resist) provided on the substrate. In general, a single substrate will contain a network of adjacent target portions that are successively patterned. Known lithographic apparatus include so-called steppers, in which each target portion is irradiated by exposing an entire pattern onto the target portion at one time, and so-called scanners, in which each target portion is irradiated by scanning the pattern through a radiation beam in a given direction (the "scanning"-direction) while synchronously scanning the substrate parallel or anti parallel to this direction. It is also possible to transfer the pattern from the patterning device to the substrate by imprinting the pattern onto the substrate.

The present invention is concerned with designing the projection system (also referred to as an optical system) for imaging the pattern onto the substrate. There are many constraints that must be met when devising a projection system and many variable parameters. The process becomes an optimization problem. The impressive progress in the global optimization of optical systems over the past two decades has resulted in powerful software tools. For optical designs for which the complexity is not too high, present-day global optimization algorithms are valuable tools for finding a good solution among the many local minima that are found in the merit function landscape. However, if the number of components is large, or if there are a large number of variable parameters such as aspheric coefficients, then even local optimization is time consuming, and it is difficult to apply such tools straightforwardly. In this case, local minima that differ from the known ones must be found with methods that use only a small number of local optimizations to achieve their goal. A further problem is that, even starting from known designs, it is difficult to generate new projection systems in a simple, efficient and systematic manner.

Therefore, what is needed is a method for designing new projection systems for lithographic projection apparatus

SUMMARY

According to one embodiment of the present invention, there is provided a method of designing a projection system for a lithographic projection apparatus comprising the following steps. Obtaining a projection system starting configuration comprising a plurality of surfaces and having a merit function value corresponding to a local minimum in a merit function space. Inserting two additional surfaces at a reference surface in the starting configuration, with a very small separation between the additional surfaces and between the additional surfaces and the reference surface. The optical material between the additional surfaces can be substantially the same as that at the reference surface. The curvatures of the two additional surfaces can be substantially the same as the curvature of the reference surface to generate a saddle point configuration of a projection system corresponding to a saddle point in merit function space. Perturbing the saddle point configuration and performing optimization on at least one side of the saddle point to obtain a new projection system configuration having a merit function value corresponding to a local minimum in the merit function space. Increasing the separation between the two inserted surfaces and between the inserted surfaces and the reference surface at which they were inserted. Outputting the resulting projection system configuration.

According to another embodiment of the present invention, there is provided a lithographic apparatus comprising an illumination system, a support, a substrate table, and a projection system. The illumination system is configured to condition a radiation beam. The support is constructed to support a patterning device, the patterning device being capable of imparting the radiation beam with a pattern in its cross-section to form a patterned radiation beam. The substrate table is constructed to hold a substrate. The projection system can be designed using method of designing a projection system for a lithographic projection apparatus and can be configured to project the patterned radiation beam onto a target portion of the substrate. In one example, the above method is used to design the projection system.

According to a further embodiment of the present invention, there is provided a device manufacturing method comprising projecting a patterned beam of radiation onto a target portion of a layer of radiation-sensitive material on a substrate using a projection system designed using of designing a projection system for a lithographic projection apparatus. For example, the method described above can be used.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate one or more embodiments of the present invention and, together with the description, further serve to explain the principles of the invention and to enable a person skilled in the pertinent art to make and use the invention.

FIG. 2 is an explanatory illustration of a network of minima and saddle points in the merit function landscape for an achromatic split doublet lens system, according to one embodiment of the present invention.

FIG. 3 shows a Fulcher achromatic quartet lens system, according to one embodiment of the present invention.

FIG. 4 illustrates a lens surface in an optical system in conjunction with various configurations of an inserted thin lens, according to one embodiment of the present invention.

FIG. 6 gives explanatory diagrammatic illustrations of the merit function space in the region of a saddle point, according to one embodiment of the present invention.

FIG. 7 shows plots of equimagnitude contours of the merit function in the region of the saddle point, according to one embodiment of the present invention.

Figure 8A:
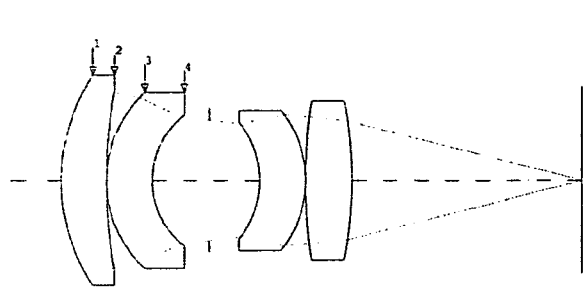
Figure 8B:
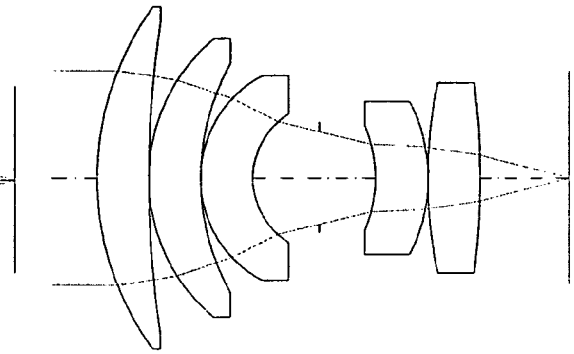

FIG. 8a illustrates a starting lens system and FIG. 8b illustrates the generated lens system corresponding to a hub in the merit function space calculated from the saddle points generated by inserting a thin lens at any of the surfaces 1, 2, 3 and 4 in FIG. 8a, according to one embodiment of the present invention.

Figure 9A:
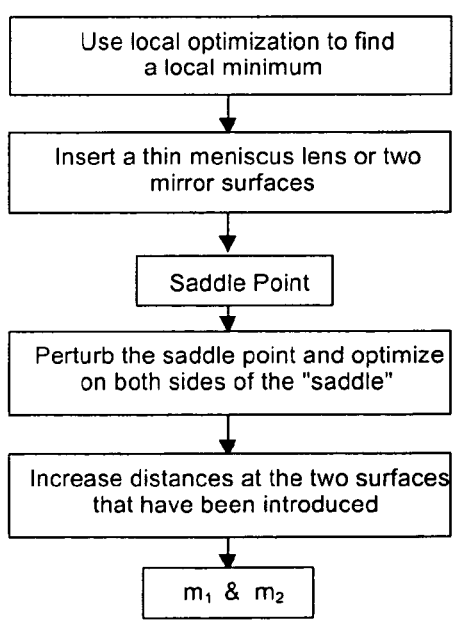

FIG. 9a is a flowchart illustrating the method, according to one embodiment of the present invention.

Figure 9B:
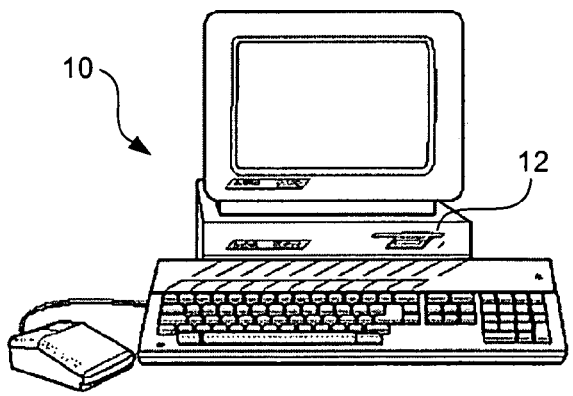

FIG. 9b illustrates a computer system for executing a computer program, according to one embodiment of the present invention.

Figure 10:
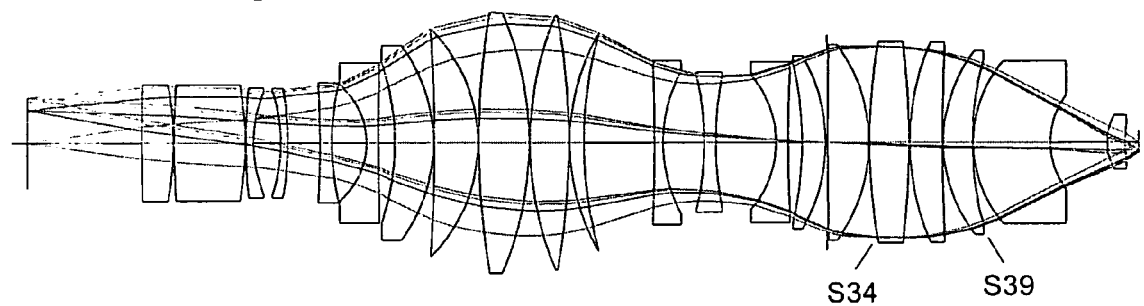

FIG. 10 shows an example of a refractive lithographic projection system having 43 surfaces used as a starting point, according to one embodiment of the present invention.

Figure 11:
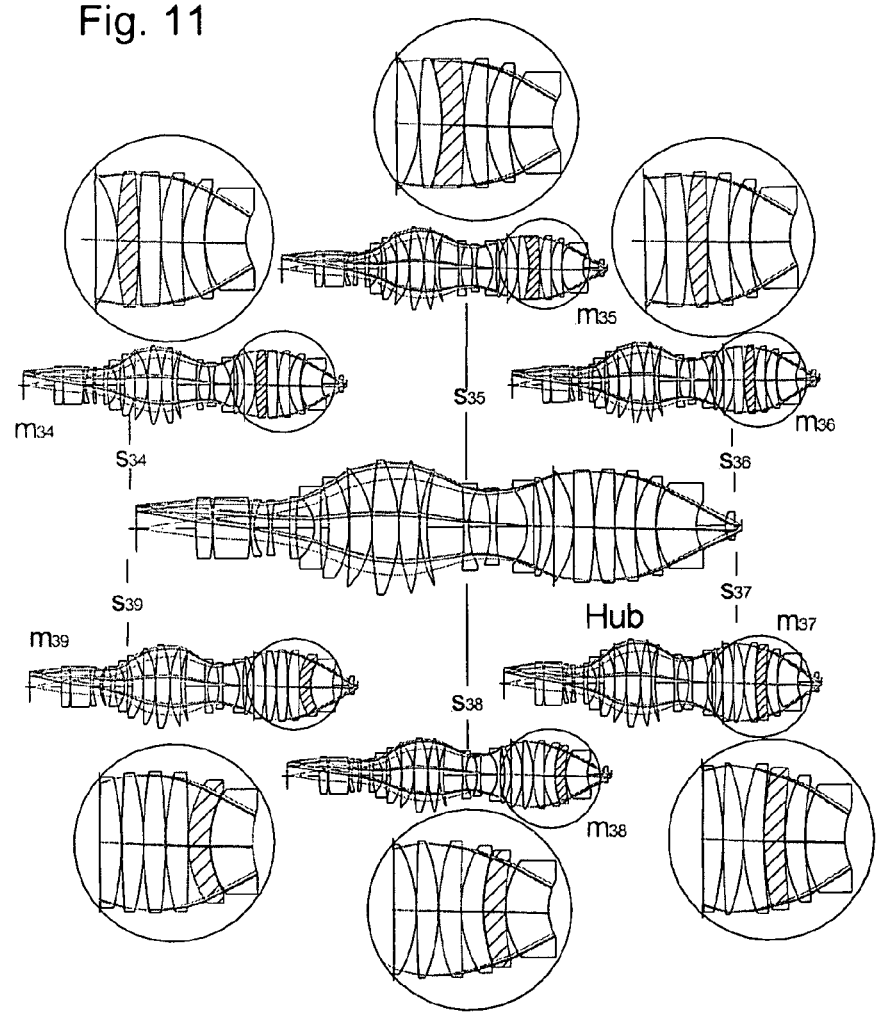

FIG. 11 shows a network of projection systems (local minima) having 45 surfaces obtained via saddle points constructed by inserting a thin lens at various surfaces in the lithographic projection system of FIG. 10, according to one embodiment of the present invention.

Figure 12:
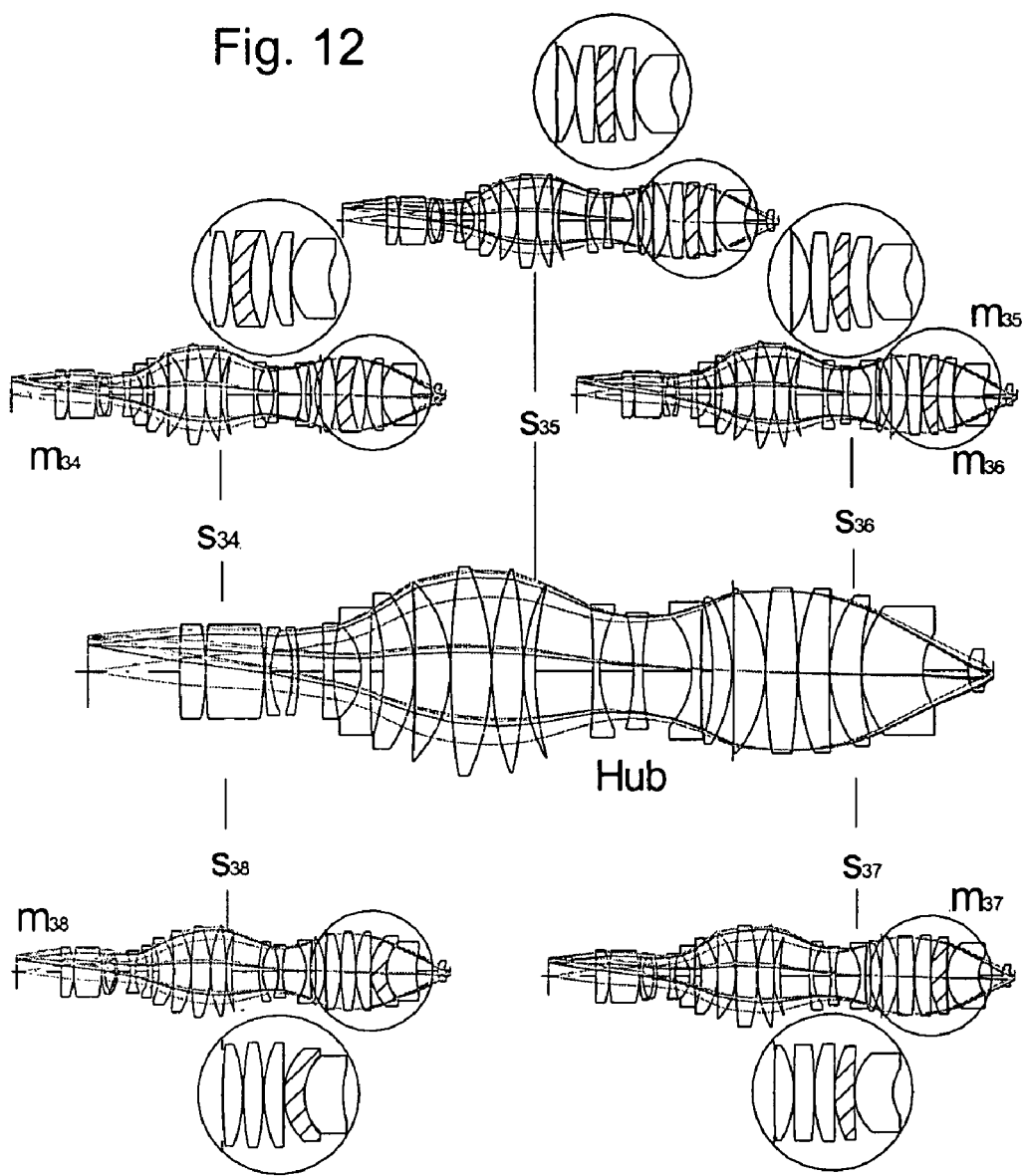

FIG. 12 illustrates a network of systems with 43 surfaces obtained by extracting various lenses from the hub system of FIG. 11 and then optimizing, according to one embodiment of the present invention.

Figure 13:
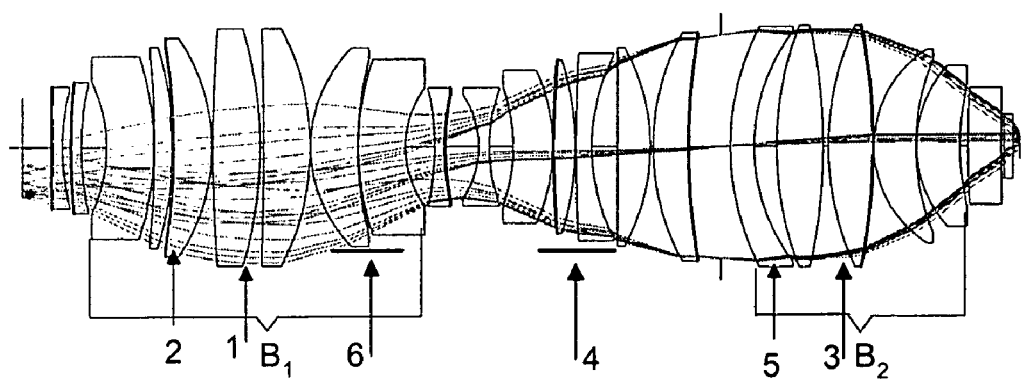

FIG. 13 illustrates a lithographic projection system having 47 surfaces used as a starting point, according to one embodiment of the present invention.

Figure 14:
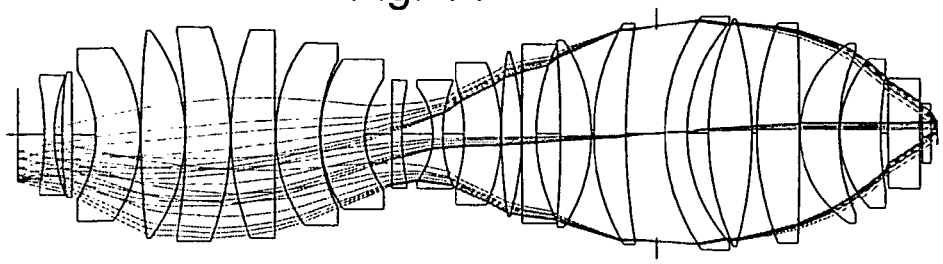

FIG. 14 illustrates a lithographic projection system obtained using the method of the invention from the starting system of FIG. 13 and having two fewer surfaces, according to one embodiment of the present invention.

Figure 15:
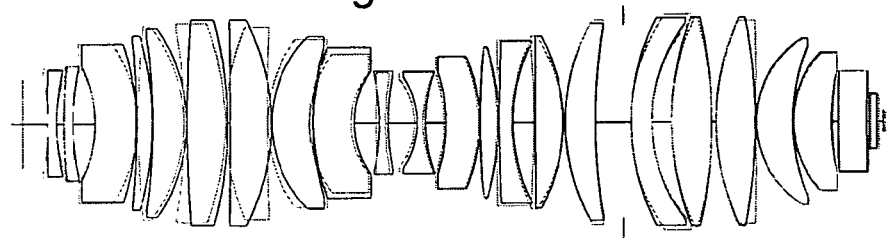

FIG. 15 shows the projections systems of FIGS. 13 and 14 superimposed, according to one embodiment of the present invention.

Figure 16:
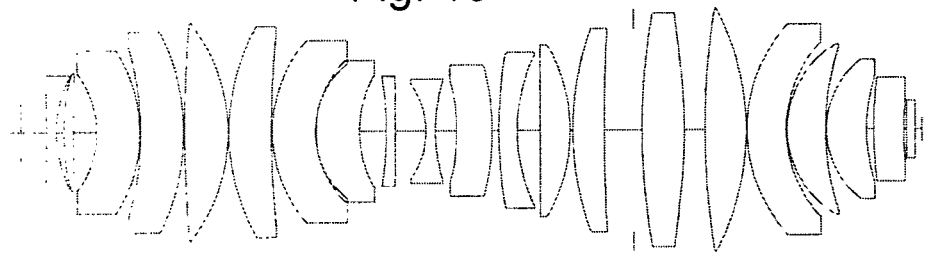

FIG. 16 shows a further refined projection lens system obtained from the system of FIG. 14 and having two fewer surfaces, according to one embodiment of the present invention.

Figure 17:
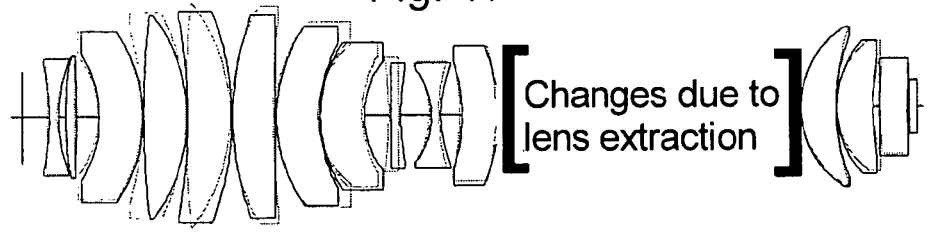

FIG. 17 shows the systems of FIGS. 14 and 16 superimposed, according to one embodiment of the present invention.

Figure 18:
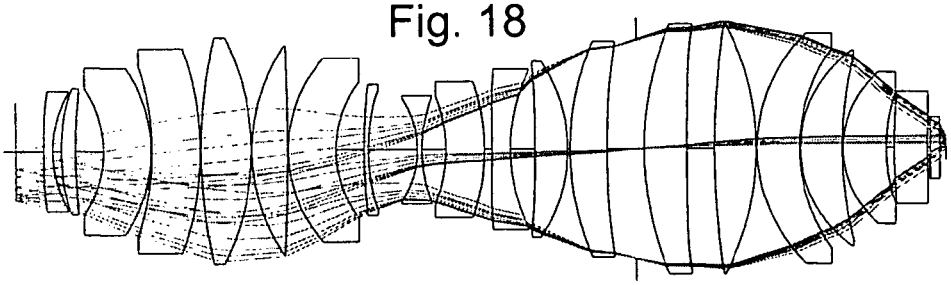

FIG. 18 shows the final optimized projection system according to one embodiment of the invention derived by merging two lenses in the system of FIG. 16 and optimizing.

Figure 19:
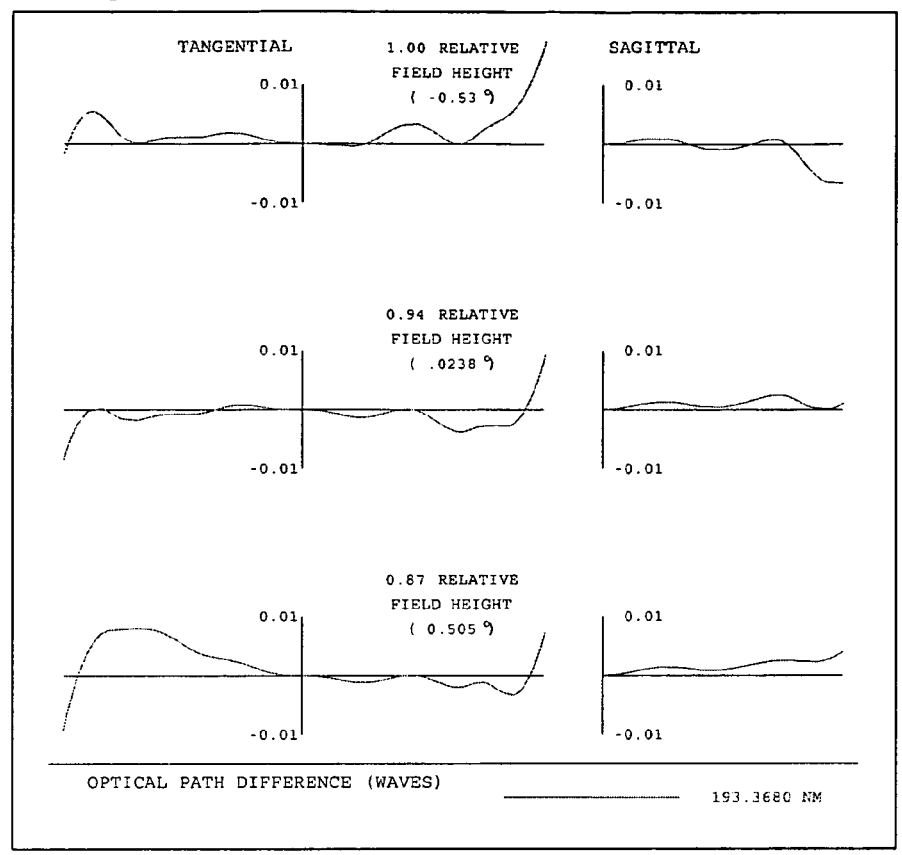

FIG. 19 gives plots of the optical path difference analysis of the system of FIG. 18, according to one embodiment of the present invention.

Figure 20:
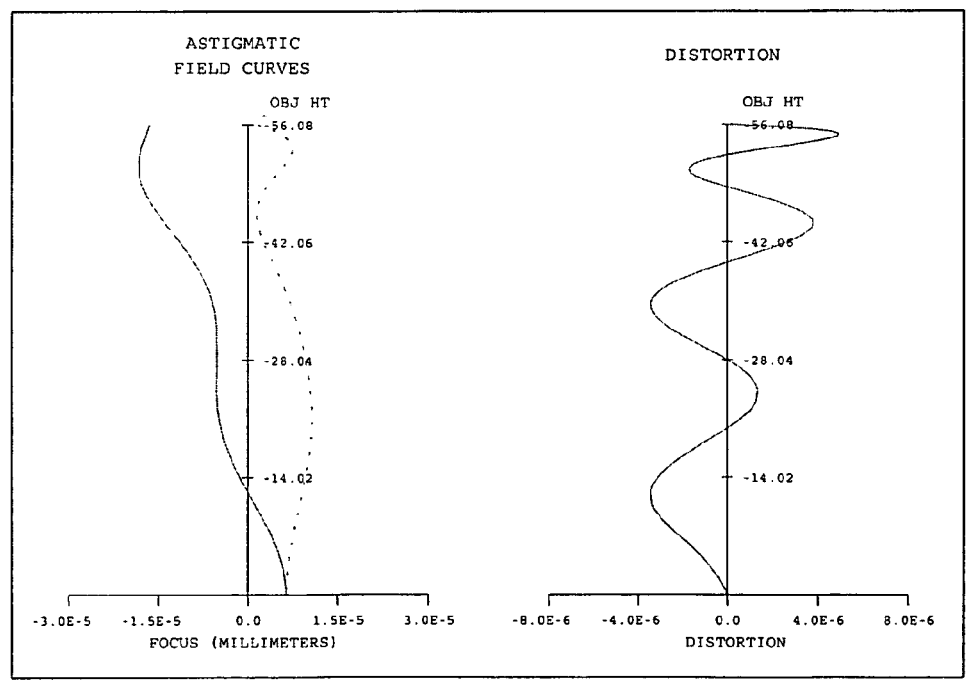

FIG. 20 shows distortion analysis of the system of FIG. 18, according to one embodiment of the present invention.

Figure 21A:
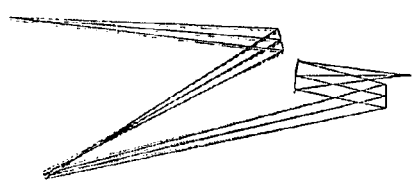

FIG. 21a shows a reflective lithographic projection system having four mirrors used as a starting point, according to one embodiment of the present invention.

Figure 21B:
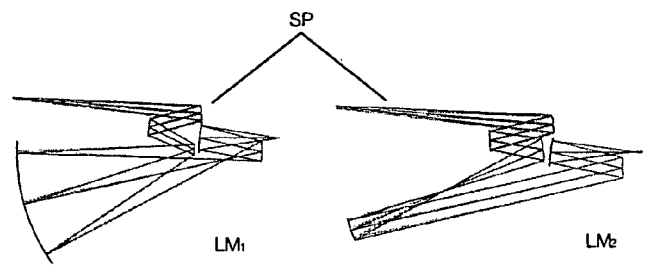

FIG. 21b shows two resulting systems constructed according to a method each having six mirrors, according to one embodiment of the present invention.

Figure 22:
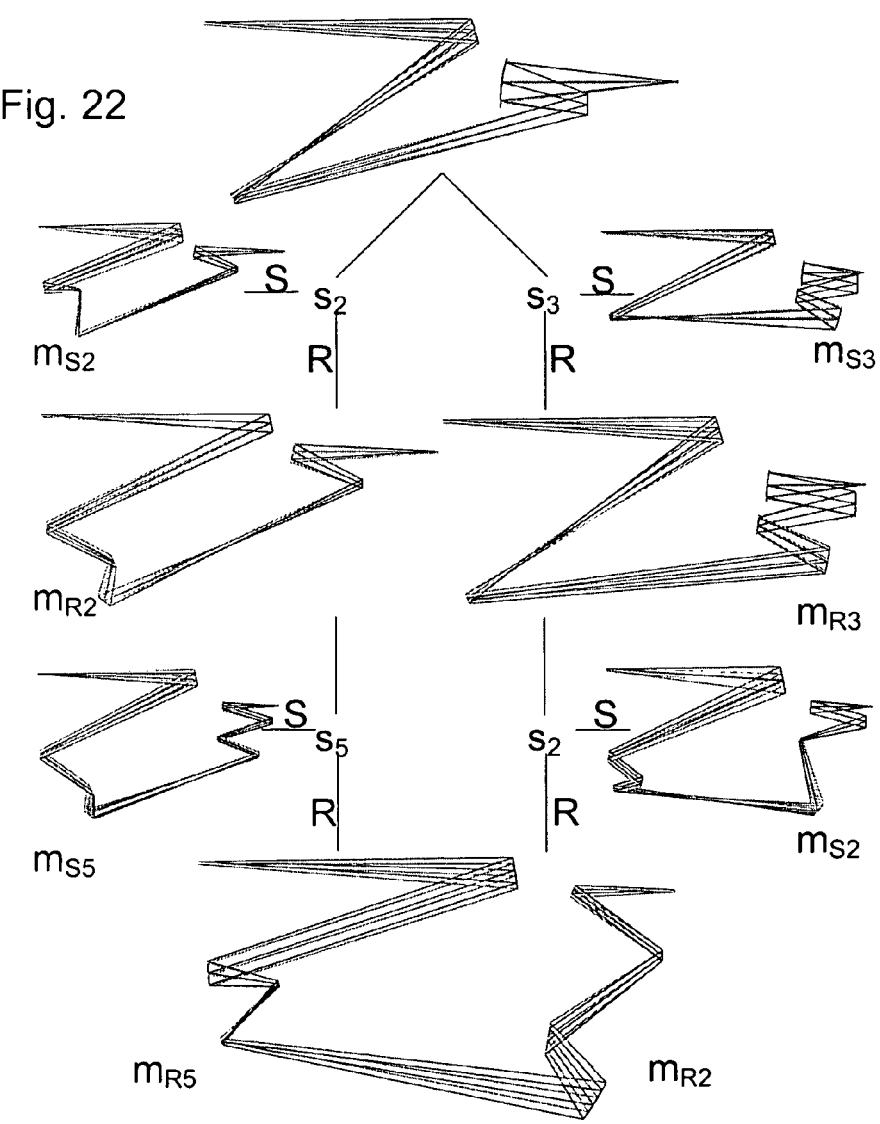

FIG. 22 shows a network of projection systems having six and eight mirrors generated by a method from a system having four mirrors, according to one embodiment of the present invention.

Figure 23:
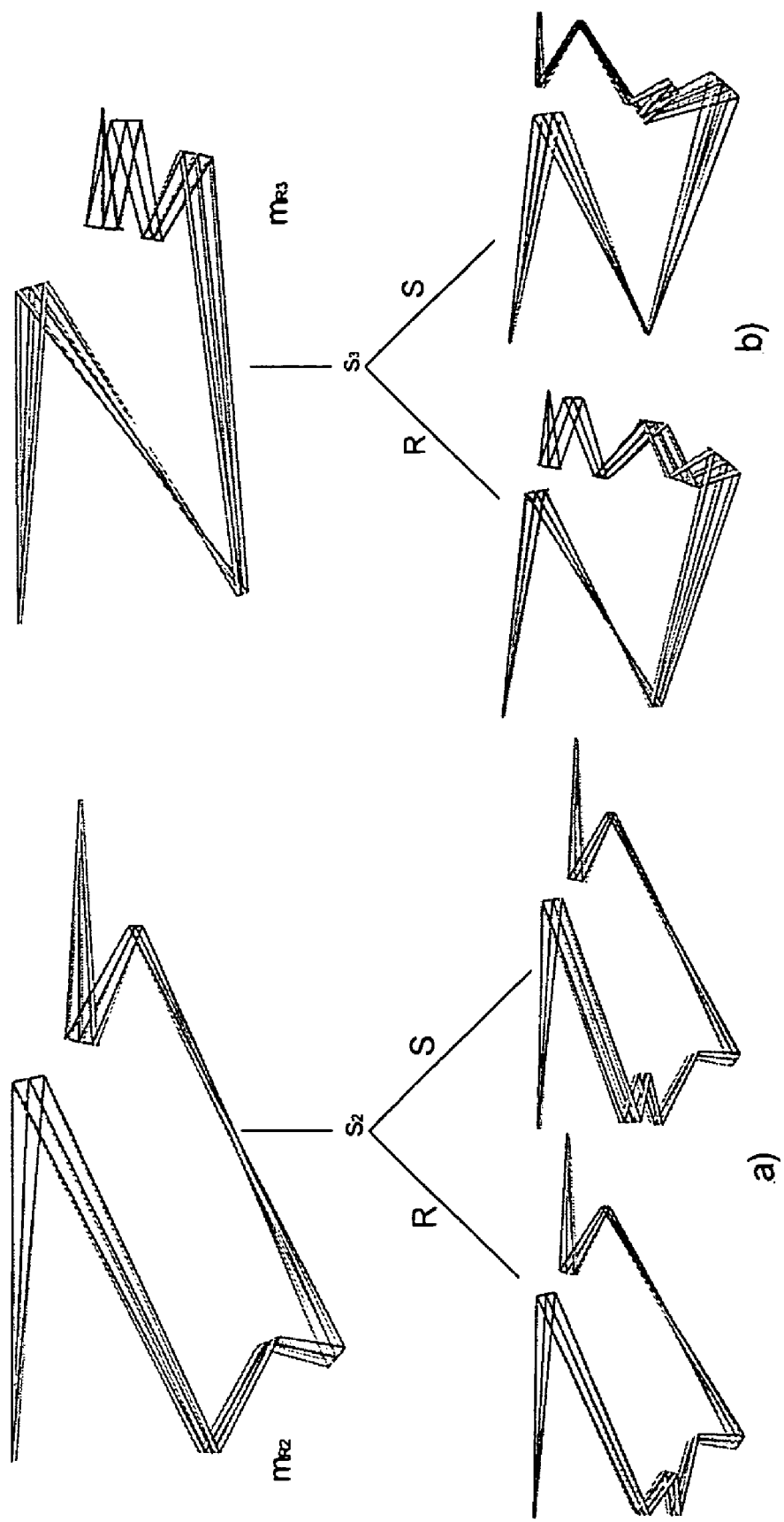

FIG. 23a illustrates a starting system having six mirrors and two new solutions having eight mirrors generated by inserting a pair of mirrors before the second mirror surface in the starting configuration, according to one embodiment of the present invention.

FIG. 23b illustrates a starting system having six mirrors and two new solutions having eight mirrors generated by inserting a pair of mirrors before the third mirror surface in the starting configuration, according to one embodiment of the present invention.

Figure 24:
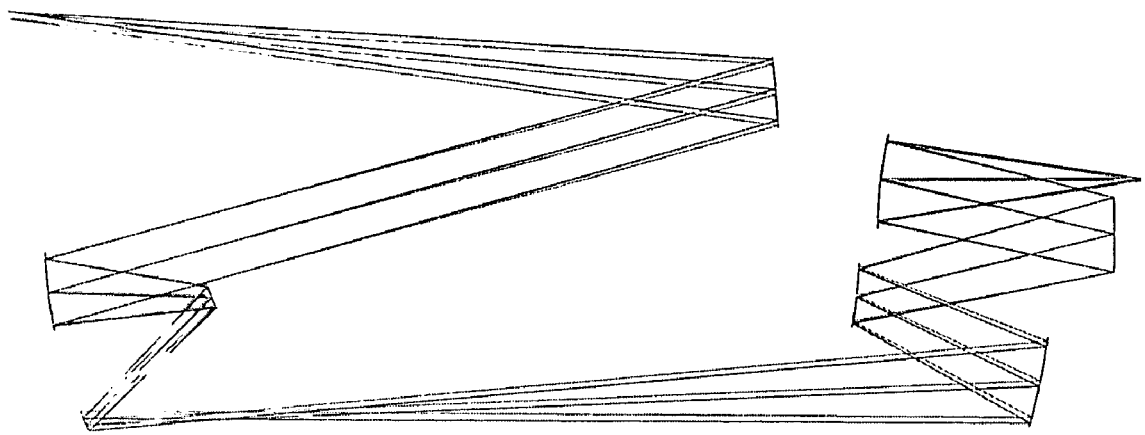

FIG. 24 illustrates an optimized eight mirror projection system according to one embodiment of the invention obtained from the system $m_{R5}$ of FIG. 22.

Figure 25:
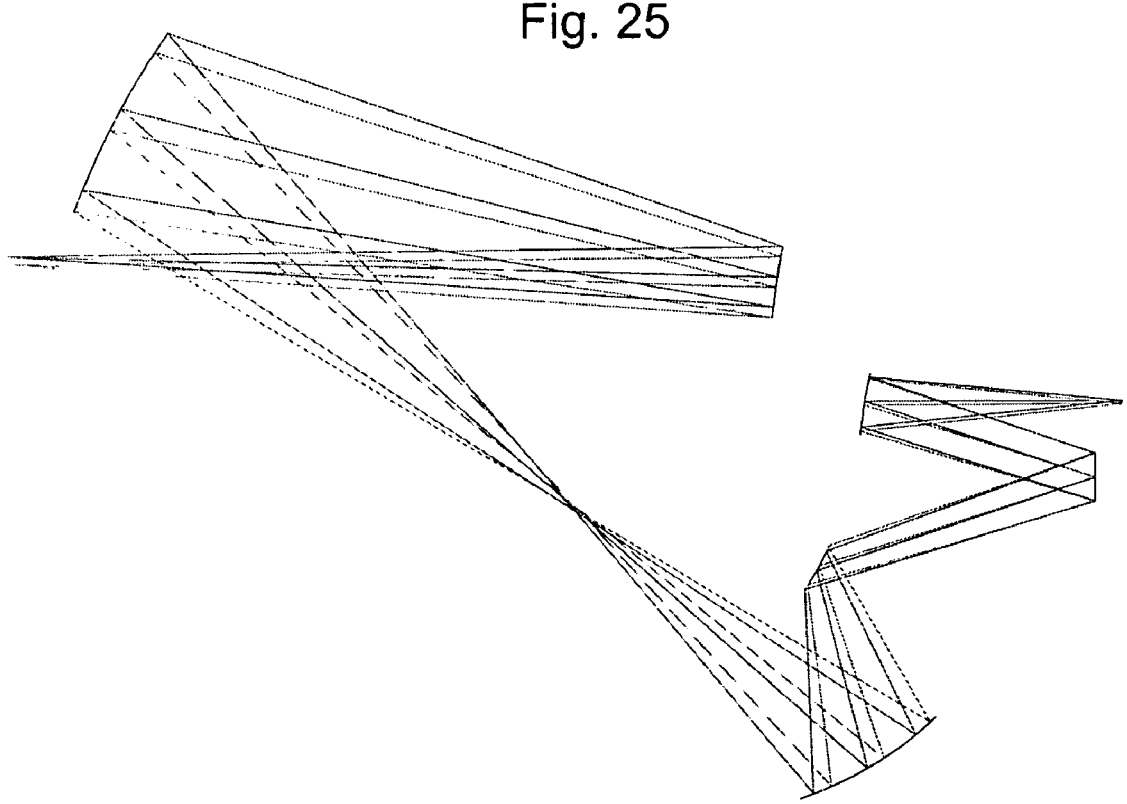

FIG. 25 illustrates a six-mirror system obtained by optimization from the saddle point $S_3$ in FIG. 22, but with the obstruction constraint relaxed when increasing distances between the inserted mirror surfaces, according to one embodiment of the present invention.

FIG. 26 illustrates a four-mirror system used as a starting point, according to one embodiment of the present invention.

FIG. 27 shows two six-mirror solutions generated from a saddle point constructed from the mirror system of FIG. 26 by inserting a pair of aspheric mirrors before the third surface, according to one embodiment of the present invention.

FIG. 28 shows a six-mirror projection system used as a starting point, according to one embodiment of the present invention.

FIG. 29 shows two solutions with eight mirrors constructed from the system of FIG. 28, according to one embodiment of the present invention.

Figure 30:
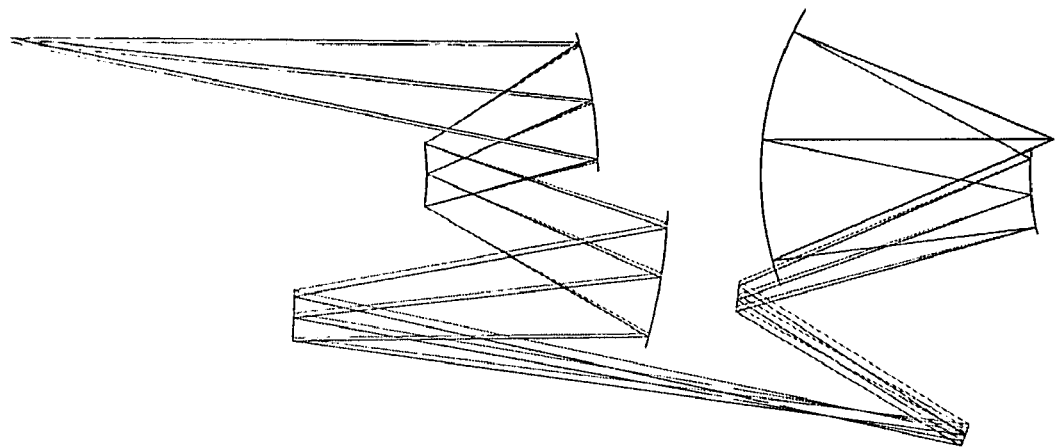

FIG. 30 shows the optimized system corresponding to minimum $m_{R2}$ of FIG. 29, according to one embodiment of the present invention.

Figure 31:
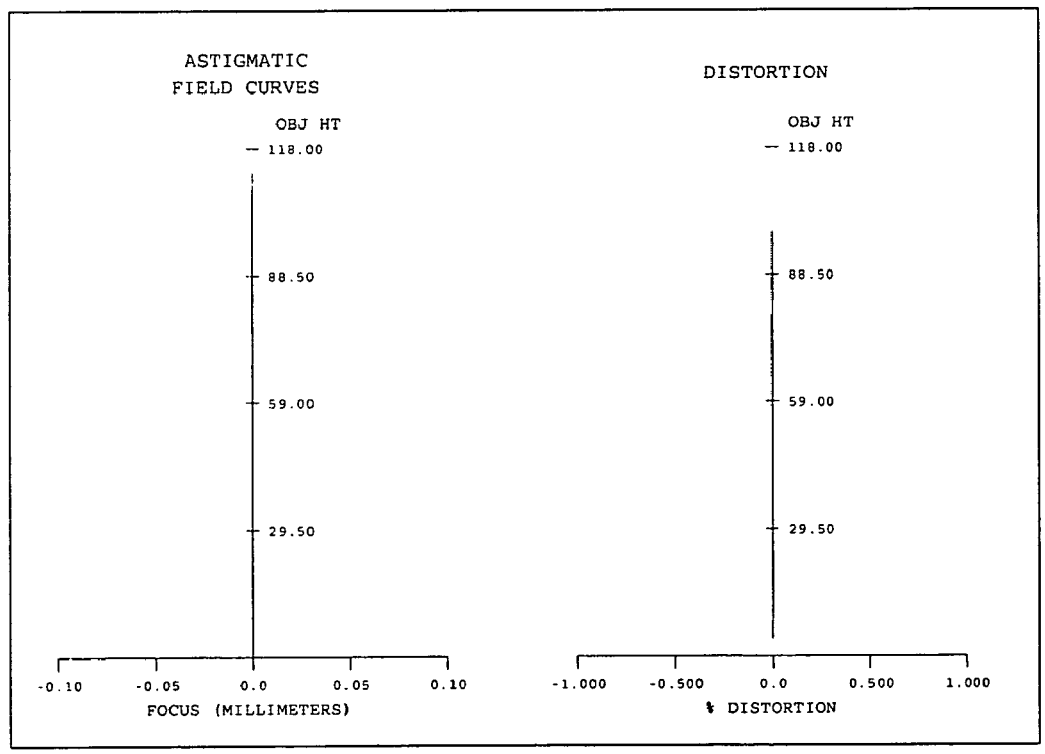

FIG. 31 shows distortion analysis plots of the system of FIG. 30, according to one embodiment of the present invention.

Figure 32:
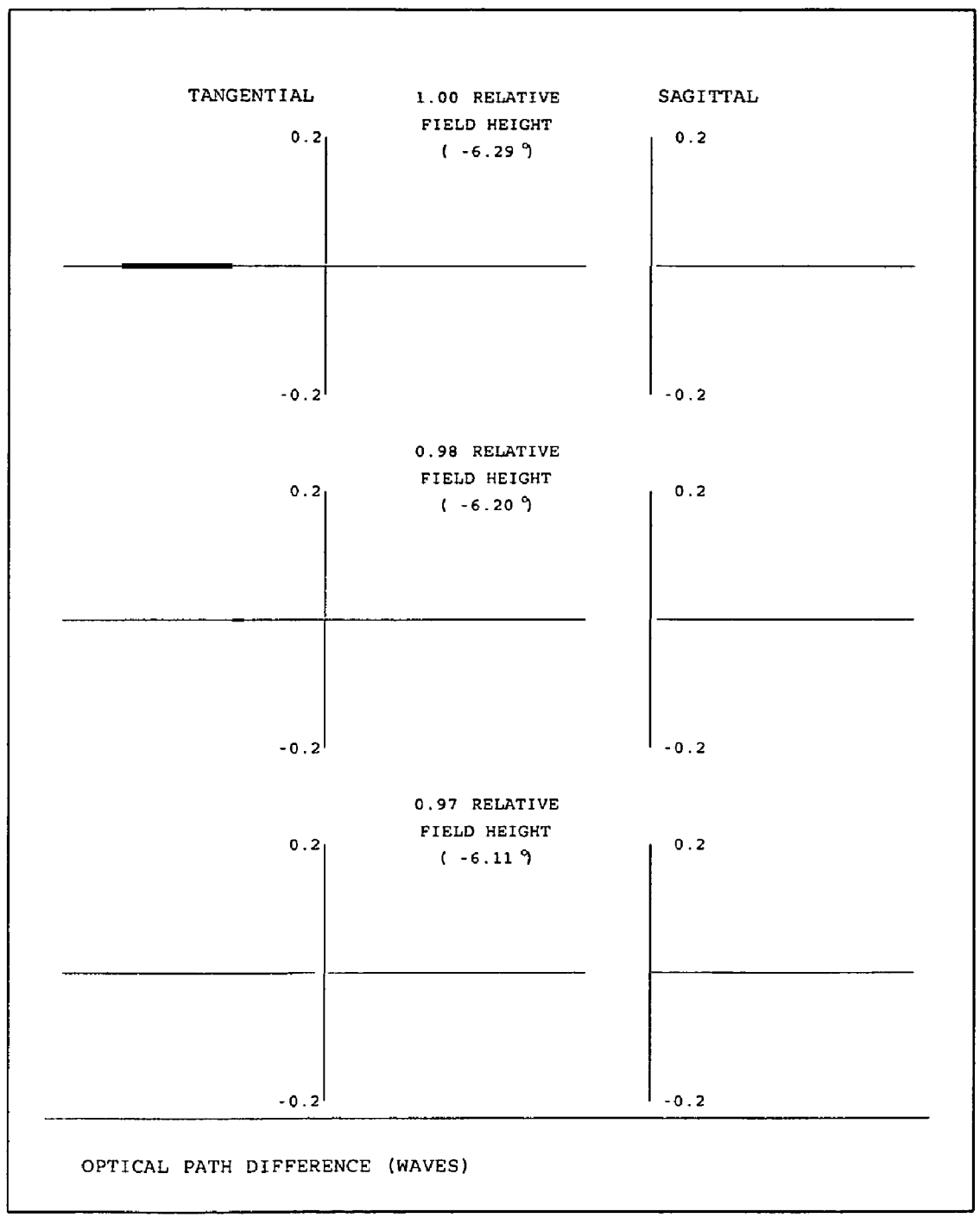

FIG. 32 shows optical path difference analysis for the system of FIG. 30, according to one embodiment of the present invention.

Figure 33:
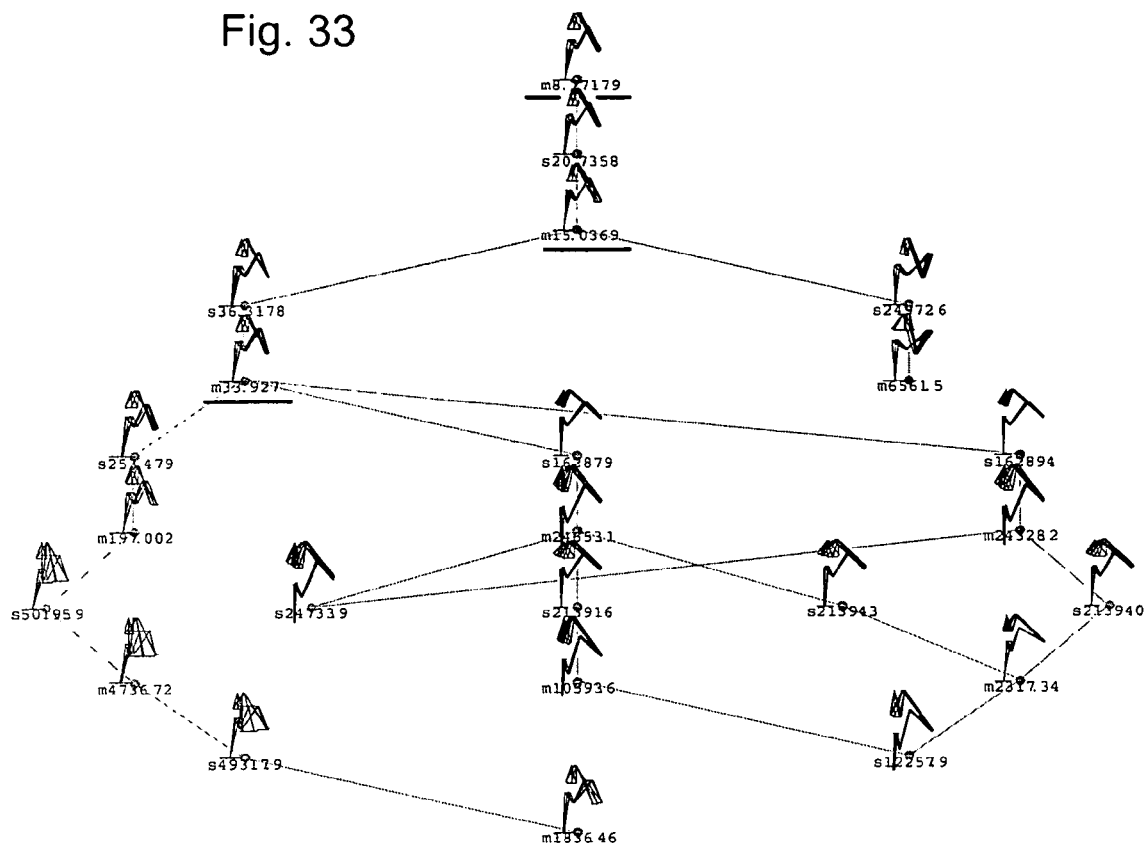

FIG. 33 illustrates a network of minima and saddle points in the merit function space of a six-mirror projection system, according to one embodiment of the present invention.

Figure 34:
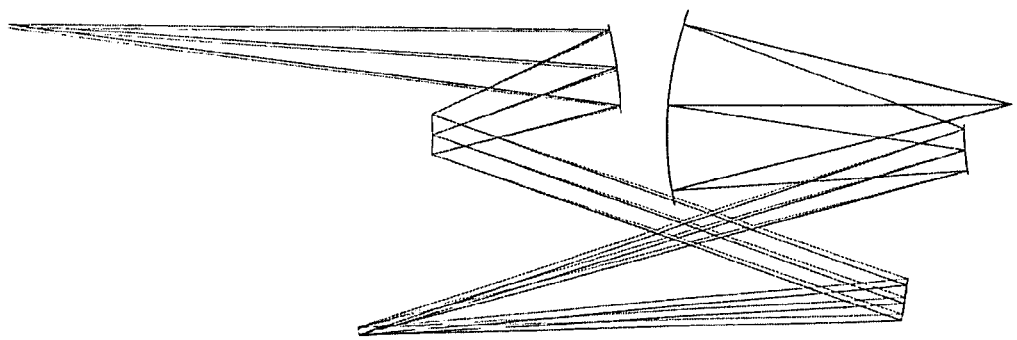

FIG. 34 shows a six-mirror projection system obtained by optimizing the best minimum system of FIG. 33, according to one embodiment of the present invention.

Figure 35:
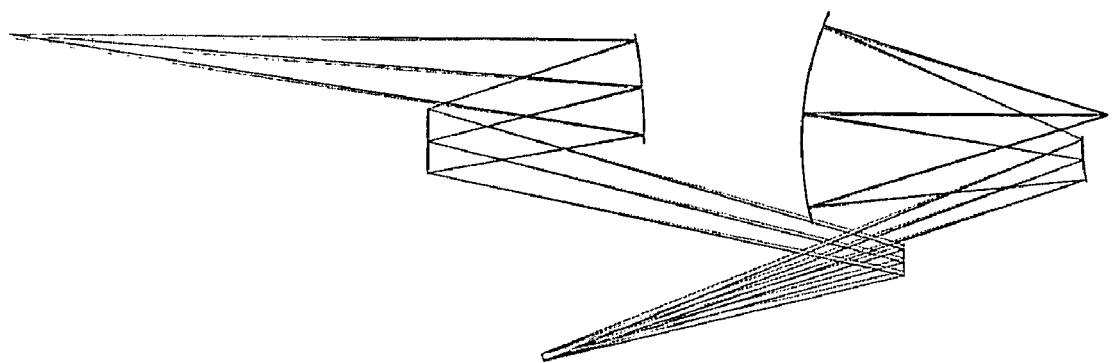

FIG. 35 shows a system obtained by increasing the numerical aperture of the system of FIG. 34 to a value of 0.3, according to one embodiment of the present invention.

Figure 36:
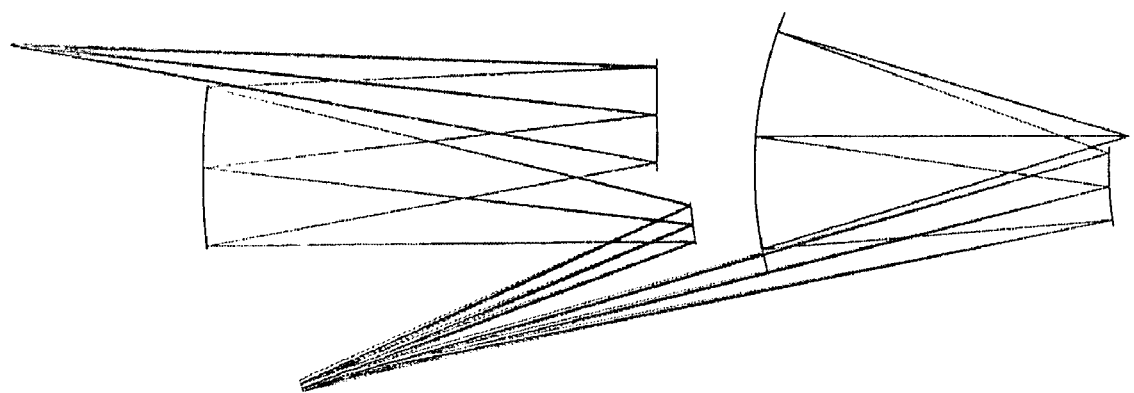

FIG. 36 illustrates a six-mirror projection system having a numerical aperture of 0.3, obtained from the best minimum system in FIG. 33, but relaxing the freedom of obscuration constraint, according to one embodiment of the present invention.

One or more embodiments of the present invention will now be described with reference to the accompanying drawings. In the drawings, like reference numbers can indicate identical or functionally similar elements. Additionally, the left-most digit(s) of a reference number can identify the drawing in which the reference number first appears.

DETAILED DESCRIPTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the invention can be implemented in hardware, firmware, software, or any combination thereof. Embodiments of the invention can also be implemented as instructions stored on a machine-readable medium, which can be read and executed by one or more processors. A machine-readable medium can include any mechanism for storing or transmitting information in a form readable by a machine (e.g., a computing device). For example, a machine-readable medium can include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

Figure 1:
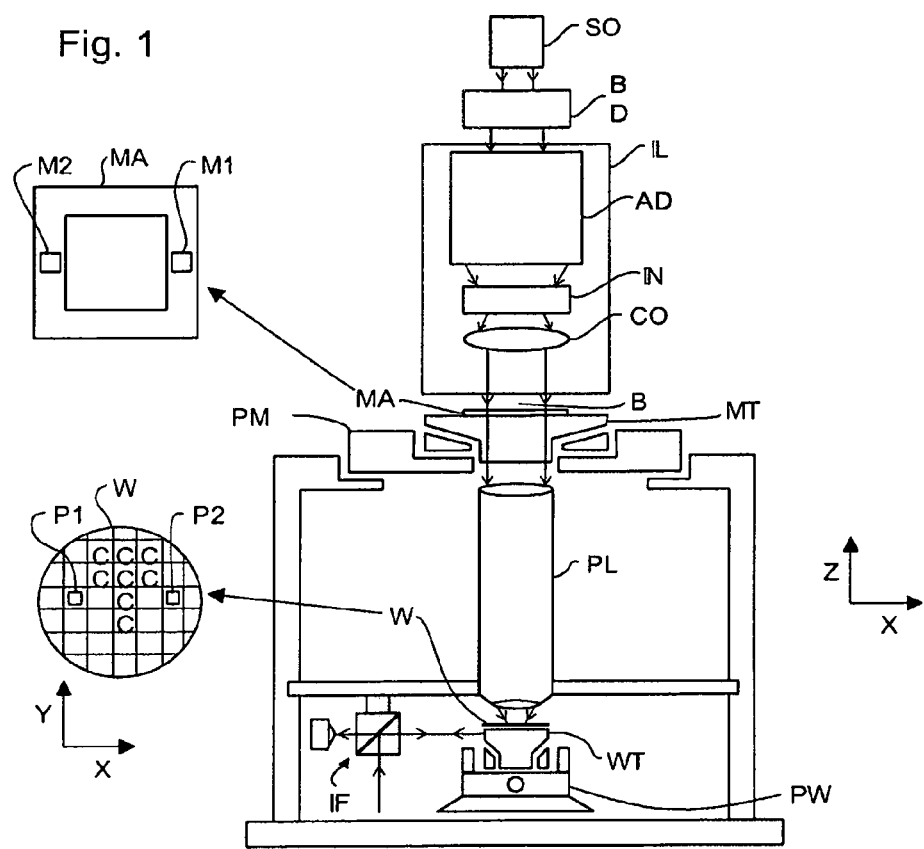
FIG. 1 depicts a lithographic apparatus, according to one embodiment of the present invention.

FIG. 1 schematically depicts a lithographic apparatus according to one embodiment of the invention. The apparatus comprises an illumination system IL, a support structure MT, a substrate table WT, and a projection system PS.

The illumination system (illuminator) IL is configured to condition a radiation beam B (e.g., UV radiation, such as DUV radiation with wavelength shorter than 300 nm, or EUV radiation with wavelength shorter than 30 nm).

The support structure (e.g., a mask table) MT is constructed to support a patterning device (e.g., a mask) MA and connected to a first positioner PM configured to accurately position the patterning device in accordance with certain parameters.

The substrate table (e.g., a wafer table) WT is constructed to hold a substrate (e.g., a resist coated wafer) W and connected to a second positioner PW configured to accurately position the substrate in accordance with certain parameters.

The projection system (e.g., a refractive projection lens system) PS is configured to project a pattern imparted to the radiation beam B by patterning device MA onto a target portion C (e.g., comprising one or more dies) of the substrate W.

The illumination system can include various types of optical components, such as refractive, reflective, magnetic, electromagnetic, electrostatic or other types of optical components, or any combination thereof, for directing, shaping, or controlling radiation.

The support structure supports, i.e., bears the weight of, the patterning device. It holds the patterning device in a manner that depends on the orientation of the patterning device, the design of the lithographic apparatus, and other conditions, such as for example whether or not the patterning device is held in a vacuum environment. The support structure can use mechanical, vacuum, electrostatic or other clamping techniques to hold the patterning device. The support structure can be a frame or a table, for example, which can be fixed or movable as required. The support structure can ensure that the patterning device is at a desired position, for example with respect to the projection system. Any use of the terms "reticle" or "mask" herein can be considered synonymous with the more general term "patterning device."

The term "patterning device" used herein should be broadly interpreted as referring to any device that can be used to impart a radiation beam with a pattern in its cross-section such as to create a pattern in a target portion of the substrate. It should be noted that the pattern imparted to the radiation beam may not exactly correspond to the desired pattern in the target portion of the substrate, for example if the pattern includes phase-shifting features or so called assist features. Generally, the pattern imparted to the radiation beam will correspond to a particular functional layer in a device being created in the target portion, such as an integrated circuit.

The patterning device can be transmissive or reflective. Examples of patterning devices include masks, programmable mirror arrays, and programmable LCD panels. Masks are well known in lithography, and include mask types such as binary, alternating phase-shift, and attenuated phase-shift, as well as various hybrid mask types. An example of a programmable mirror array employs a matrix arrangement of small mirrors, each of which can be individually tilted so as to reflect an incoming radiation beam in different directions. The tilted mirrors impart a pattern in a radiation beam which is reflected by the mirror matrix.

The term "projection system" used herein should be broadly interpreted as encompassing any type of projection system, including refractive, reflective, catadioptric, magnetic, electromagnetic and electrostatic optical systems, or any combination thereof, as appropriate for the exposure radiation being used, or for other factors such as the use of an immersion liquid or the use of a vacuum. Any use of the term "projection lens" herein can be considered as synonymous with the more general term "projection system".

As here depicted, the apparatus is of a transmissive type (e.g., employing a transmissive mask). Alternatively, the apparatus can be of a reflective type (e.g., employing a programmable mirror array of a type as referred to above, or employing a reflective mask).

The lithographic apparatus can be of a type having two (dual stage) or more substrate tables (and/or two or more mask tables). In such "multiple stage" machines the additional tables can be used in parallel, or preparatory steps can be carried out on one or more tables while one or more other tables are being used for exposure.

The lithographic apparatus can also be of a type wherein at least a portion of the substrate can be covered by a liquid having a relatively high refractive index, e.g., water, so as to fill a space between the projection system and the substrate. An immersion liquid can also be applied to other spaces in the lithographic apparatus, for example, between the mask and the projection system. Immersion techniques are well known in the art for increasing the numerical aperture of projection systems. The term "immersion" as used herein does not mean that a structure, such as a substrate, must be submerged in liquid, but rather only means that liquid is located between the projection system and the substrate during exposure.

Referring to FIG. 1, the illuminator IL receives a radiation beam from a radiation source SO. The source and the lithographic apparatus can be separate entities, for example when the source is an excimer laser. In such cases, the source is not considered to form part of the lithographic apparatus and the radiation beam is passed from the source SO to the illuminator IL with the aid of a beam delivery system BD comprising, for example, suitable directing mirrors and/or a beam expander. In other cases the source can be an integral part of the lithographic apparatus, for example when the source is a mercury lamp. The source SO and the illuminator IL, together with the beam delivery system BD if required, can be referred to as a radiation system.

The illuminator IL can comprise an adjuster AD for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL can comprise various other components, such as an integrator IN and a condenser CO. The illuminator can be used to condition the radiation beam, to have a desired uniformity and intensity distribution in its cross section.

The radiation beam B is incident on the patterning device (e.g., mask MA), which is held on the support structure (e.g., mask table MT), and is patterned by the patterning device. Having traversed the mask MA, the radiation beam B passes through the projection system PS, which focuses the beam onto a target portion C of the substrate W. With the aid of the second positioner PW and position sensor IF (e.g., an interferometric device, linear encoder or capacitive sensor), the substrate table WT can be moved accurately, e.g., so as to position different target portions C in the path of the radiation beam B. Similarly, the first positioner PM and another position sensor (which is not explicitly depicted in FIG. 1) can be used to accurately position the mask MA with respect to the path of the radiation beam B, e.g., after mechanical retrieval from a mask library, or during a scan. In general, movement of the mask table MT can be realized with the aid of a long-stroke module (coarse positioning) and a short-stroke module (fine positioning), which form part of the first positioner PM. Similarly, movement of the substrate table WT can be realized using a long-stroke module and a short-stroke module, which form part of the second positioner PW. In the case of a stepper (as opposed to a scanner) the mask table MT can be connected to a short-stroke actuator only, or can be fixed. Mask MA and substrate W can be aligned using mask alignment marks M1, M2 and substrate alignment marks P1, P2. Although the substrate alignment marks as illustrated occupy dedicated target portions, they can be located in spaces between target portions (these are known as scribe-lane alignment marks). Similarly, in situations in which more than one die is provided on the mask MA, the mask alignment marks can be located between the dies.

The depicted apparatus could be used in at least one of the following modes:

1. In step mode, the mask table MT and the substrate table WT are kept essentially stationary, while an entire pattern imparted to the radiation beam is projected onto a target portion C at one time (i.e., a single static exposure). The substrate table WT is then shifted in the X and/or Y direction so that a different target portion C can be exposed. In step mode, the maximum size of the exposure field limits the size of the target portion C imaged in a single static exposure.

2. In scan mode, the mask table MT and the substrate table WT are scanned synchronously while a pattern imparted to the radiation beam is projected onto a target portion C (i.e., a single dynamic exposure). The velocity and direction of the substrate table WT relative to the mask table MT can be determined by the (de-)magnification and image reversal characteristics of the projection system PS. In scan mode, the maximum size of the exposure field limits the width (in the non-scanning direction) of the target portion in a single dynamic exposure, whereas the length of the scanning motion determines the height (in the scanning direction) of the target portion.

3. In another mode, the mask table MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Combinations and/or variations on the above described modes of use or entirely different modes of use can also be employed.

Exemplary Projection System Design

Demands for microchips with smaller and smaller feature sizes can be partially satisfied with improved design techniques for the projection system between the patterning device and substrate. The scope of optical system design is to generate a system that fulfils as closely as possible the requirements for a certain application (e.g., rms (root-mean-squared) wavefront aberration, distortion, tolerances, etc.).

From an initial starting configuration, an optical design program changes the system parameters to produce a mathematical prescription describing the shapes and locations of elements, materials, etc. The design of an optical system is done in a number of steps: 1. select a starting configuration; 2. establish the variables (i.e., the system's parameters which are changed during the optimization); 3. define the constraints (i.e., a set of operands which limit the variation domain of the variables, so that the system satisfies the requirements of a specific application); and 4. define a function of the system parameters, called merit function (or error function), that measures the image performance.

The general process of optimization begins with the selection of the starting configuration. The starting configuration is described in the merit function space by the vector $x=(x_1, x_2, \ldots, x_N)$, where $x_i$ are the optimization variables. Examples of variables are the surface curvatures (or radii), the axial distances between the surfaces, the aspheric coefficients, surface tilts and decenters, and the glass characteristics. However, the most important variables are usually the curvatures, which determine the first order power, thus the ray paths through the system. The evolution of these variables can be limited by the use of constraints. These constraints can include items such as magnification, ray angles, telecentricity and virtually any other system requirements. In optical system design two types of constraints are used:

1. equality constraints $$c_i(x)=p_i, \text{ with } i=1, \ldots, m<N$$

2. inequality constraints $$d_j(x) \leq q_j \text{ with } j=1,\ldots,N$$

Inequality constraints are used when the variation of a system parameter is permitted within a certain domain. When the optimization reaches the boundary of the allowed region, the inequality constraint becomes an equality constraint and it is now active during optimization.

The purpose of optimization is to minimize the merit function of the optical system, which is defined as the sum of the squares of the operands:

$$F(x) = \Sigma w_i (f_i(x))^2$$

where $f_i$ is the operand and $w_i$ is the weight on the operands. The squares are used, so that a negative value of a defect does not compensate a positive value of another defect.

The optimization program seeks a solution in the merit function space of the optical system, for which:

$$\nabla F(x) = 0,$$

where $$\nabla F(x) = \left( \frac{\partial F}{\partial x_1}, \ldots, \frac{\partial F}{\partial x_N} \right)$$

This equation is solved in an iterative process, by changing at each cycle the vector x. The optical design program detects the closest solution to the starting point, which is located within the boundary conditions and satisfies the imaging goals. This process is called local optimization. The disadvantage is that, in the merit function space, a better solution might exist at a different location.

Numerous algorithms have been proposed to solve the optimization problem. However, most optical design programs use some form of damped least-squares (DLS) method. The DLS method is a downhill optimizer, which means that the merit function is allowed only to decrease during optimization. If the change in one of the system parameters causes an increase in the merit function, the algorithm will consider the direction unproductive and will not proceed in optimizing the design along that direction. The method detects the nearest local minimum to the starting configuration.

To detect the minimum with the best imaging performance (i.e., the global minimum), the designer must use global optimization methods, which search the entire space by perturbing and placing the variables in different regions. The multi-dimensional merit function space comprises a large number of local minima. Detecting the best one (i.e., the local minimum with the best imaging performance) is a difficult task. Nowadays, available for the designer are global optimization algorithms, such as global synthesis, global explorer, simulated annealing, genetic algorithms, escape function and network global search method. Global Synthesis is implemented in the Code V software referred to later in this description.

Global Synthesis is a "black box" global optimization algorithm. However, its usage has shown powerful capabilities in detecting existing local minima in the merit function space.

Global Explorer is an escape approach. The idea behind the method is that, when, during optimization, the design falls in the basin of attraction of a local minimum, an escape function, $f_E$, can be added to the previously defined merit function, $F(x)$. The shape of the merit function, $F(x)$, changes around the local minimum when the escape function is added. This enables the optimization to escape the existing basin and find another local minimum.

A suitable design for lithography apparatus must satisfy not only the required optical performance, but also the economical and mechanical demands. For example, the larger the departure from sphericity of an optical element, the more expensive the manufacturing process becomes. The challenge is to design a projection system with high-quality, which satisfies the demands imposed by all subsystems comprised in the tool (i.e., source, mask, multilayer, wafer, etc.).

For example, the requirements imposed on an EUV mirror projection system, include:

1. Telecentricity

An optical system is telecentric when the chief ray is parallel to the optical axis in the object and/or image plane. An EUV mirror system must be telecentric at the image plane and quasi-telecentric at the object plane. The quasi-telecentricity requirement implies that either the upper or the lower marginal ray must be almost parallel to the optical axis. The reason is that an EUVL tool has a reflective mask, which is illuminated by the condenser system.

2. Working Space

Working space is defined as: the distance from the mask to the mirror closest to the object plane and the mirror closest to the image plane to the wafer. Achieving the required working space at the wafer can be difficult since the solid angle of the image bundles has the largest value at that location. State of the art EUV mirror systems have a working distance larger than 45 mm.

3. Magnification

Magnification, M, is defined as the ratio of the image size to the object size:

$$M = -\frac{\text{Image height}}{\text{Object height}}$$

In the design of EUV projection systems the requirement is that the mask is imaged onto the wafer with a magnification of about 1:4 or about 1:5. A negative magnification indicates that the mask and the wafer move in different directions during the scanning process of the lithographic tool. A movement of the two stages in the same direction could induce a higher stability of the exposure tool.

4. Distortion

A non-constant magnification results in a disproportionality in the image effect called distortion. For EUV lithography process, distortion is acceptable only in the order of a few nanometers. State of the art projection systems have the distortion corrected below 1 nm.

5. Total Track

The total track is the distance from the mask to the wafer. For instance, four-mirror systems have a length of about 0.5 m, six-mirror systems of about 1 m, and eight-mirror systems of about 1.5 m.

6. Angles of Incidence

The reflection at the multilayer coated mirror decreases with the increase of the angles of incidence variation. The variation is defined as the difference between the chief ray angle and the upper/lower marginal angle at the surface. For a good compatibility, the variation of the incidence angles should be smaller than about 6°.

7. Mirror Sizes

In one example, the diameter of a mirror in an EUV projection system should be smaller than about 400 mm. This can be because of the limitations of the polishing tools.

8. Imaging Quality

The EUV mirror systems should have a root-mean-square (RMS) wavefront aberration smaller than about $\lambda/20$. An exemplary Alpha tool six-mirror projection optics developed by manufactures have a composite RMS wavefront aberration below about $\lambda/40$.

9. Obscuration

An optical system is obstructed when a surface intersects and blocks rays, which should propagate freely between two consecutive surfaces. Because the presence of obscuration deteriorates the resolution, the freedom of obscuration is a stringent requirement in the design of EUV projection systems.

10. Small Number of Mirrors

The number of elements in an EUV mirror system is minimized because each additional surface reduces the throughput at the substrate. The reflection at a multilayer surface is smaller than about 75%. The advantages of a design with large number of elements are the high achievable numerical aperture and the large number of optimization variables used to satisfy the imaging requirements.

In terms of numerical aperture, a four-mirror system can have a maximum value of about 0.15. Six-mirror designs can achieve a value of about 0.3. Two additional mirrors will increase the maximum limit to about 0.4.

11. Small Asphericity

The reduced number of elements in an EUV mirror system may not provide sufficient optimization variables to correct the aberrations. For example, an EUV six-mirror system has only six curvatures that can be used as optimization variables to minimize the residual aberrations. In order to increase the number of optimization parameters, each surface can be made aspheric. However, in order to obtain diffraction limited performance, the departure from sphericity on each mirror can be controlled during the optimization at a value below about 20 μm.

The EUV projection optics disclosed herein can comprise four to eight mirrors, each having an aspheric shape. The result is a large number of optimization variables (i.e., at least 48 for an eight-mirror system, given by: the 8 curvatures, 8 axial distances, and at least 4 aspheric coefficients per surface). In the merit function space, with the dimensions given by the number of variables, conventional optimization algorithms encounter difficulties, that are generated for example by large angles of incidence at the surfaces, stagnation, or high-order aspheric coefficients. It is desirable to alleviate these problems and difficulties in embodiments of the present invention described below.

As explained above, in optical system design the multidimensional merit function space typically comprises a large number of local minima. It can be shown that these local minima are connected via optimization paths that start from a specific type of saddle point (saddle point with Morse index of 1) and form a network. For complex systems, the detection of the entire network is difficult and time consuming. In such cases, the generation of new local minima must be performed with methods that use a limited number of local optimizations to achieve their goal.

Studies of the network structure of the set of local minima have shown that there is a certain degree of order in the merit function landscape of optical systems. This order is best understood if one focuses not only on local minima, but on saddle points as well. Minima, saddle points and maxima are all critical points, i.e., the gradient of the merit function vanishes at these points. An important property of (non-degenerate) critical points is the so-called Morse index (also referred to herein by the abbreviation MI). (When critical points "merge" they are called degenerate.) Intuitively, one can think about a two-dimensional saddle point (a horse saddle for example), which is a minimum along a certain direction and a maximum along the perpendicular direction. Similarly, critical points in an N-dimensional optimization problem have a set of mutually orthogonal directions. Along some of these directions the critical points are minima, along the other ones (called downward directions) they are maxima. The Morse index is the number of downward directions. Thus, for minima and maxima the Morse index is 0 and N, respectively, and saddle points have a Morse index between 1 and N−1.

For our purposes, saddle points with Morse index 1 are of special interest. They are maxima in one direction, which one can visualize as the downward direction of a two-dimensional saddle point, and they are minima in the remaining N−1 directions, which are all very similar to the upward direction in the two-dimensional case. As in a two-dimensional situation, choosing two points close to each other, but on opposite sides of the saddle and starting local optimizations at those points will lead to two distinct minima. In most cases, which minima are reached is determined by the merit function landscape and not by the implementation details of the local optimization algorithm. Otherwise, the two paths down the gradient from the saddle point can be determined, more accurately but at the cost of extra computer time, with a differential equation. Together with the saddle point, the two downward paths form a link in the variable space between the two local minima.

Detecting Morse index 1 saddle points without a-priori information about them is computationally more expensive than finding local minima. However, the analysis of the networks corresponding to less complex systems shows recurring properties that facilitate the task, at least for a certain type of saddle points.

It is interesting to study how networks change when control parameters such as aperture, field or system parameters that have not been used for optimization are changed. In fact, saddle points with Morse index 1 can be further classified according to the way in which they appear in or disappear from the network when control parameters are changed. We mention, without entering into many mathematical details, that the classification can be made mathematically rigorous by using Catastrophe Theory. Some saddle points tend to appear in and disappear from the network more easily and are therefore in a certain sense less fundamental. We have already reported examples of such appearances and disappearances in the networks of EUV lithographic objectives (in that example we have the so called "fold" catastrophe) and of the Cooke Triplet (the "cusp" catastrophe). (A local minimum always appears/disappears together with the saddle point in these cases.)

In this discussion we will focus on a more robust and therefore more fundamental type of Morse index 1 saddle point, which will be called "curvature" saddle point. The name comes from the fact that such saddle points already exist in simple systems consisting of thin spherical lenses in contact, where the only variables are curvatures. In the following discussion it will be shown that curvature saddle points for arbitrary optical systems can be generated from local minima taken from a variable space with lower dimensionality.

Systems of thin spherical lenses, in which all lens thicknesses and air spaces between lenses are set equal to zero, and for which the merit function includes only spherical aberration, are simple enough to be studied analytically in detail. This model, which relies on third-order aberration theory, can seem oversimplified, but as will be seen below it enables us to understand a mechanism that is also present in systems having a much higher complexity.

A first example of such a system of thin spherical lenses is the monochromatic split doublet. For a monochromatic split doublet, software can detect six local minima and five saddle points (see FIG. 2; minima are denoted m, and saddle points are denoted s). The systems have small equal distances between the surfaces and three of the curvatures have been used as variables during optimization. Two of the local minima, $m_1$ and $m_5$, have values of the merit function that are very close. It has been shown that local minima such as $m_5$ can appear or disappear easily when changes in the merit function construction are made. Therefore, the network part containing $m_5$ and the saddle point, $s_5$, is less stable. The rest of the network is not affected by changes in the merit function definition and the systems are considered stable.

From the remaining saddle points, $s_1$-$s_4$, by means of local optimization, four local minima have been generated ($m_1$-$m_4$). Their configuration resembles four basic shapes for split achromatic doublets: the Fraunhofer, Steinheil, Gauss, and Reversed Gauss. On the other side, each saddle point is connected to the same local minimum, called the hub. Even if this local minimum has a low performance in terms of Seidel aberrations, it is a good illustration of a relaxed configuration. In the remainder of this description, the convention will be adopted in which the side of the saddle on which the hub is situated will be called the R-side. The opposite side will be denoted as the S-side.

The analysis of these four detected saddle points shows interesting properties: two of the saddle points, $s_2$ and $s_3$, have three curvatures approximately equal ($c_1 \approx c_2 \approx c_3$), while the remaining saddle points have two of their curvatures approximately equal ($c_1 \approx c_2$, respectively $c_3 \approx c_4$). For the case of thin lenses in contact, in a model using third order spherical aberration, these curvatures are rigorously equal according to the above relations and they take the values given in Table 1 for a thin-lens doublet (refractive index n=1.5).

TABLE 1

| Surface | Equal curvatures | $c_1$ | $c_2$ | $c_3$ | $c_4$ |
|---|---|---|---|---|---|
| $S_1$ | $c_1 = c_2$ | −12/7 | −12/7 | 12/7 | −2/7 |
| $S_2$ | $c_1 = c_2 = c_3$ | 12/7 | 12/7 | 12/7 | −2/7 |
| $S_3$ | $c_2 = c_3 = c_4$ | 12/7 | −2/7 | −2/7 | −2/7 |
| $S_4$ | $c_3 = c_4$ | 12/7 | −2/7 | 22/7 | 22/7 |

The values of the curvatures of the doublet saddle points, $s_2$ and $s_3$, can be easily obtained from the parameters of a single lens. In the two saddle points we observe that the value of one curvature appears three times. This indicates that these saddle points can be constructed by inserting a thin meniscus lens, having the same curvatures as the one of the surface where it is introduced. It turns out that one can construct saddle points with N+2 surfaces from systems with N surfaces. The method can be used when all curvatures are variables, as well as when some of them play the role of control parameters. However, a restriction is necessary at the present stage of the method, and it is related to the type of material used for the optical elements. In this discussion, the method is described for systems in which all lenses are made of the same material.

A second example of such a system of thin spherical lenses now under discussion is the monochromatic split triplet. Table 2 reproduces the exact values of the curvatures of several curvature saddle points of a monochromatic triplet with refractive index n=1.5, and object at infinity. (The first five curvatures were used as independent variables, the sixth one was used to keep the focal length unity.)

TABLE 2

The curvatures of four of the six Morse index 1 saddle points of a thin-lens triplet.

| $c_1$ | $c_2$ | $c_3$ | $c_4$ | $c_5$ | $c_6$ |
|---|---|---|---|---|---|
| 6/7 | 6/7 | 6/7 | −1/7 | 11/7 | 4/7 |
| 6/7 | −1/7 | −1/7 | −1/7 | 11/7 | 4/7 |
| 6/7 | −1/7 | 11/7 | 11/7 | 11/7 | 4/7 |
| 6/7 | −1/7 | 11/7 | 4/7 | 4/7 | 4/7 |

With the same method, the values of the curvatures of certain local minima in these systems (called the "hubs") can also be computed analytically. Unlike most local minima, which have a small number of links in the network, the hubs have many links. The hub for a monochromatic doublet (focal length unity, n=1.5, object at infinity) has for instance:

$$c_1 = 6/7, \ c_2 = -1/7, \ c_3 = 11/7, \ c_4 = 4/7 \qquad \text{Eq. (1)}$$

Note that the curvatures of the triplet saddle points in Table 2 can be very simply derived from the parameters of the doublet local minimum given by (1). The triplet curvature values are those given by (1), but for each saddle point, one of these curvatures appears three times successively. Physically, this numerical property can be interpreted as follows: the four triplet saddle points are obtained by inserting successively one meniscus lens at the four surfaces of the doublet hub. In all cases, the meniscus lens has equal curvatures, and their common value is equal to the curvature of the original doublet surface where the meniscus is introduced. It results from general formulas for systems of thin lenses in contact that curvature saddle points with N+2 surfaces can be obtained in the same way from hubs with N surfaces. This happens when all curvatures are used as variables, and also when some of them are used as control parameters.

Using the first curvature in the system as a control parameter (and not as a variable) is useful for studying the relationship between the hubs and the curvature saddle points generated with the above mechanism. (In this analysis, we consider a hub that has the same number of lenses as the saddle points.) Our analytic results show that as long as the first curvature is lower than a certain critical value, all curvature saddle points are linked on one side with the same hub. When the first curvature reaches the critical value, the hub, the surrounding Morse index 1 saddle points and, when they exist, also saddle points with a higher Morse index, merge into a single degenerate critical point. In the two-dimensional doublet example discussed in other work this degenerate critical point is called the "monkey saddle." Mathematically we encounter here the so-called "elliptic umbilic" situation. In the spirit of Catastrophe Theory, it can be the that three non-degenerate curvature saddle points are "shaken loose" from the monkey saddle. Such degenerate critical points exist in higher dimensions as well. In the case of a triplet with four variable curvatures and a curvature used as control parameter, the higher-order equivalent of the monkey saddle is a critical point that is 16-fold degenerate. When the first curvature is below the critical value, this degenerate critical point splits into a local minimum (a hub), 5 curvature saddle points with Morse index 1, and 10 saddle points with Morse index 2.

For the monochromatic doublet, triplet and quartet, Fulcher has derived the curvatures of the minimum, which we call hub, several decades ago. These systems turn out to be relaxed designs. While the hub doublet has a poor imaging quality, the Fulcher monochromatic quartet, as shown in FIG. 3, with n=1.5 is a remarkable system. By optimizing the thin-lens Fulcher specifications and adding adequate lens thicknesses, we obtain for axial imaging at a numerical aperture of about 0.6 a Strehl Ratio of about 0.999. Note in FIG. 3 the smooth bending of the ray paths and the similarity with elements in designs of lithographic objectives. In fact, we have found that hubs exist also for high-quality lithographic designs. It is worth investigating in detail whether, as it seems, there is a more general correlation between the hub structure and relaxation.

We have seen in the previous discussion that inserting concentric thin meniscus lenses into a local minimum of the third-order spherical aberration (these minima were hubs) transforms the given minimum into a curvature saddle point. Surprisingly, this relationship is valid more generally, for arbitrary rotationally symmetric systems. In the following discussion we generalize this technique and show how curvature saddle points can be obtained from arbitrary local minima of arbitrary optical merit functions. A certain restriction (described below) on glass and axial thicknesses is used in this analysis, but it will be shown subsequently that this restriction can be removed.

We consider the k-th surface of a system with N spherical surfaces that is a local minimum (FIG. 4a). The value of the merit function is $MF_{ref}$ and the curvature of the surface is $c_{ref}$. After the surface we introduce a thin lens with zero axial thickness in contact with the k-th surface (i.e., the axial thickness of the airspace before the introduced lens is also zero). The thin lens has the same glass as the lens before it and the surfaces are also spherical. (In this section we discuss spherical lenses, but the technique can be generalized for mirror surfaces and for aspheric surfaces as well.)

First, assume that the curvatures $c_{k+1}$ and $c_{k+2}$ of the thin lens are varied, but are kept equal. (Since a zero-thickness lens with identical surfaces disappears physically, we call it a "null" lens.) This "null" lens has no effect on ray propagation, and the merit function of the new system with N+2 surfaces remains equal to $MF_{ref}$ (FIG. 4b). Similarly, if the curvatures $c_k$ and $c_{k+1}$ are varied, but are kept equal, the air space before the lens becomes a "null" lens. If in addition for the second curvature of the thin lens we have $c_{k+2}=c_{ref}$, the merit function of the new system remains again unchanged by the insertion and equal to $MF_{ref}$ (FIG. 4c). (Note that, although the curvature $c_k$ of the original minimum with N surfaces is varied, the second curvature of the new thin lens takes its role and ensures that $MF_{ref}$ remains unchanged.)

FIG. 4a shows the k-th surface with curvature $c_{ref}$ of a system that is a local minimum. All rays pass undeviated through the thin lens with surfaces k+1 and k+2 if either the thin lens has equal curvatures as in FIG. 4b or the thin air meniscus before the thin lens has equal curvatures and the second thin-lens curvature is $c_{ref}$ as in FIG. 4c. FIG. 4d shows a curvature saddle point in which three consecutive surfaces have the same curvature $c_{ref}$. For clarity, in FIGS. 4a to 4d, the thin lens and the air space before it are drawn with non-zero thickness.

The transformations can be seen as:

$$c_k = c_{ref}, c_{k+1} = c_{k+2} = u, \text{ all other variables of the minimum are kept unchanged,} \quad \text{Eq. (2)}$$

$$c_k = c_{k+1} = v, c_{k+2} = c_{ref}, \text{ all other variables of the minimum are kept unchanged,} \quad \text{Eq. (3)}$$

Figure 5:
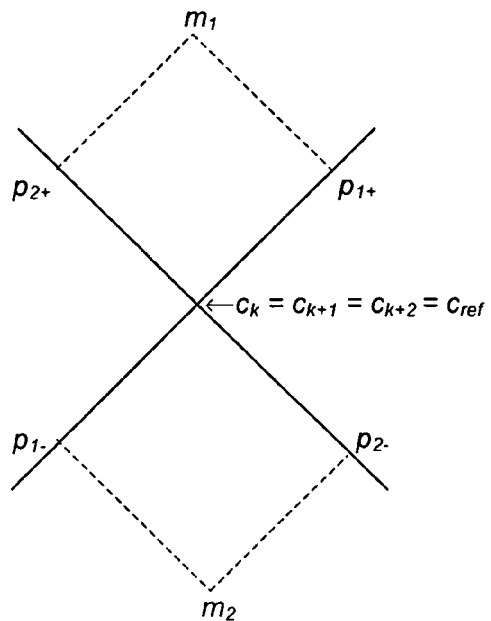
FIG. 5 illustrates schematically lines in the merit function space of FIGS. 4b to 4d along which the merit function is invariant, according to one embodiment of the present invention.

These describe two lines in the variable space of the new system with N+2 surfaces (see FIG. 5). The position of individual points along these lines is given by the parameters u and v. As shown above, along both lines the merit function is invariant and equal to $MF_{ref}$. The two invariant lines intersect for $u=v=c_{ref}$, i.e., $$c_k = c_{k+1} = c_{k+2} = c_{ref}, \text{ all other variables of the minimum are unchanged.} \quad \text{Eq. (4)}$$

The position of individual points along these lines is given by the parameters u and v. For example, two points can be defined on each line ($p_{1-}$, $p_{1+}$ and $p_{2-}$, $p_{2+}$) by setting in Eqs. (2) and (3)

$$u = (|c_{ref}| \mp \epsilon) \cdot (-1)^n$$

$$v = (|c_{ref}| \mp \epsilon) \cdot (-1)^n \quad \text{Eq. (5)}$$

where n=0 if $c_{ref}>0$ n=1 if $c_{ref}<0$ and $\epsilon$ indicates a small change in the curvature. When local optimization is performed at these points two new local minima (with N+2 surfaces) are generated, $m_1$ and $m_2$. Finally, at each minimum the thickness of the inserted thin meniscus and the distance between it and the surface where it was introduced are increased.

The above analysis has been based on initially inserting a (hypothetical) zero-thickness meniscus lens at any surface in the system. The same effect can be obtained using reflective optics by inserting two mirror surfaces with zero distance between them at any surface in the system. Again this is a hypothetical construction, and the obscuration condition must be relaxed initially because the two mirror surfaces will block each other, but the same procedure can be followed to obtain new minima and practically workable projection systems.

Thus two new minima (i.e., locally optimal optical systems) have been created by constructing a saddle point with MI=1 having N+2 surfaces, by inserting at any surface in a previous known local minimum a zero-thickness meniscus lens (or two mirror surfaces with zero distance between them). This method is discussed in more detail below.

In the above analysis we assumed that a thin lens with surfaces k+1 and k+2 is inserted after the k-th surface in an existing design that is a local minimum. However, Eqs. (2-4) are also valid if a thin lens with surfaces k and k+1 is placed before the k+2-th surface in an existing minimum. In this case, the invariant lines (2) and (3) are related to the "null" airspace lens and the "null" glass lens that are formed, respectively.

Figure 6A:
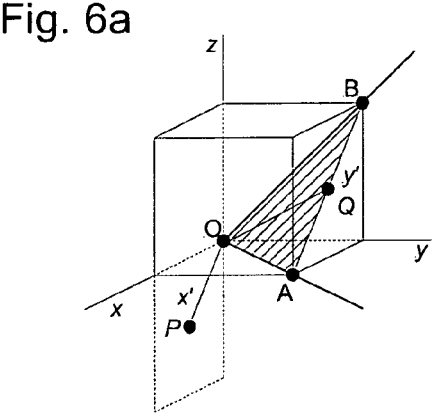

We will analyze below the properties of the intersection point (Eq. 4) (see FIG. 4d) in the variable space of the new system with N+2 surfaces. It is sufficient for this purpose to examine the three-dimensional subspace of the variables $c_k$, $c_{k+1}$ and $c_{k+2}$. Referring to FIG. 6a, plane OAB is defined by the invariant lines Eq. (2) and Eq. (3) in the subspace defined by the variables $c_k$, $c_{k+1}$ and $c_{k+2}$ (hatched). Note that point P also belongs to this plane. The coordinate system in FIG. 6a has: $x=c_k-c_{ref}$; $y=c_{k+1}-c_{ref}$; and $z=c_{k+2}-c_{ref}$.

In the unit cube in FIG. 6a, the invariant lines Eq. (3) and Eq. (2) are oriented along the respective vectors:

$$\vec{OA}=(1,1,0),\ \vec{OB}=(0,1,1) \quad \text{Eq. (6)}$$

It is convenient to rotate the coordinate system so that the points in the plane OAB can be parameterized by only two numbers (instead of three). Since OA=OB=AB, the angle between OA and OB is 60 degrees, and the two lines do not form a rectangular coordinate system. However, an orthogonal axis system in the plane OAB can be easily constructed. The new axes x' and y' are then oriented along the vectors:

$$\vec{OP}=(\vec{OA}-\vec{OB})/2=(\tfrac{1}{2},0,-\tfrac{1}{2}),\ \vec{OQ}=(\vec{OA}+\vec{OB})/2=(\tfrac{1}{2},1,\tfrac{1}{2}) \quad \text{Eq. (7)}$$

(See FIG. 6a.) The axis z' orthogonal to the plane OAB (not shown in FIG. 6a) is then oriented along (1,−1,1). By taking unit-length vectors along OP and OQ, the position of an arbitrary point in the plane OAB is given by $$x'\frac{2}{\sqrt{2}}\vec{OP}+y'\frac{2}{\sqrt{6}}\vec{OQ}=\begin{pmatrix}\frac{x'}{\sqrt{2}}+\frac{y'}{\sqrt{6}},\\ \sqrt{\frac{2}{3}}y',\ \frac{y'}{\sqrt{6}}-\frac{x'}{\sqrt{2}}\end{pmatrix}. \quad \text{Eq. (8)}$$

The three curvatures for the points in the plane OAB are then given by $$c_k = c_{ref} + \frac{x'}{\sqrt{2}} + \frac{y'}{\sqrt{6}},$$

$$c_{k+1} = c_{ref} + \sqrt{\frac{2}{3}}\,y',$$

$$c_{k+2} = c_{ref} + \frac{y'}{\sqrt{6}} - \frac{x'}{\sqrt{2}}. \quad \text{Eq. (9)}$$

Figure 6B:
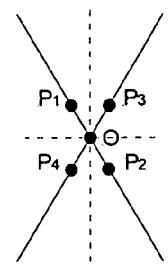

If in a plane two lines, along which a function is constant, cross, then the crossing point is a two-dimensional saddle point of that function. In the plane OAB the two invariant lines intersect in O. Referring to FIG. 6b, the two invariant lines (continuous lines) and the orthogonal axes x' and y' (horizontal and vertical dashed lines) are in the same plane. All these lines cross at the saddle point O. We show now that O is a critical point. It is well known that the direction of the most rapid variation of a function is orthogonal to the direction along which the function is constant. Therefore, at each point along the invariant lines, the projection on OAB of the gradient of the merit function is orthogonal to the invariant lines. At the intersection point, the projection of the gradient must be zero, because it cannot point in two different directions. Therefore, in the plane OAB the point O is a two-dimensional saddle point. (It cannot be a two-dimensional maximum or minimum, because in these cases the equimagnitude contours are ellipses, not straight lines.) Along one of the orthogonal axes in the plane OAB the point O is a minimum, along the other one it is a maximum. Because for the original local minimum the merit function derivative with respect to $c_k$ was already zero, the point O is also a minimum along the direction of Ox, outside OAB. Consequently, the merit function derivatives with respect to x, y and z must all be zero at O. Because the variables of the original local minimum other than $c_k$ are kept unchanged, the merit function derivatives with respect to them remain zero. Thus, all components of the gradient of the merit function are zero at O.

We have shown that O is a maximum in one direction in the plane OAB, that it is a minimum in the orthogonal direction in that plane, and that it is also a minimum with respect to the variables of the original local minimum other than $c_k$. The only direction that remains to be studied is that of Oz'. In the cases we have examined, numerical tests indicated that along (1,−1,1) O was also a minimum. (This is plausible because along Ox, which is also outside the plane OAB, we know that O must be a minimum.) Thus, typically the curvature saddle point O is a Morse index 1 saddle point. (If counterexamples with O a maximum along Oz' will be found, then in those cases the Morse index will be 2 and the procedure described in the next section for generating local minima from the saddle point must be adapted.)

In the examples shown in this description we use the optical design software CODE V (R) by Optical Research Associates, Pasadena, Calif., USA, and our merit function is the default merit function of this program based on transverse aberrations. The local optimization variables are the surface curvatures, the object is at infinity and the last curvature has to be solved to keep the effective focal length constant.

Figure 7A:
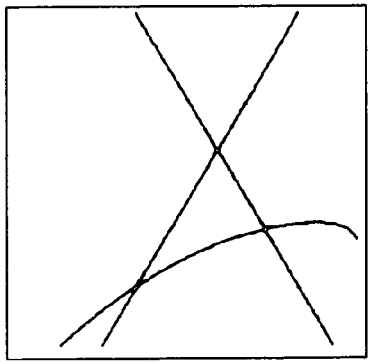
Figure 7B:
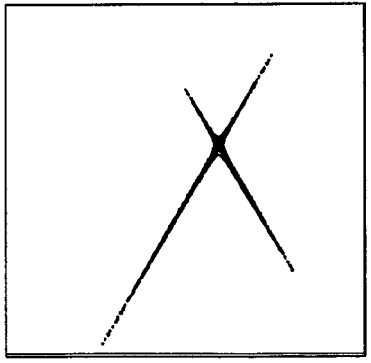
Figure 7C:
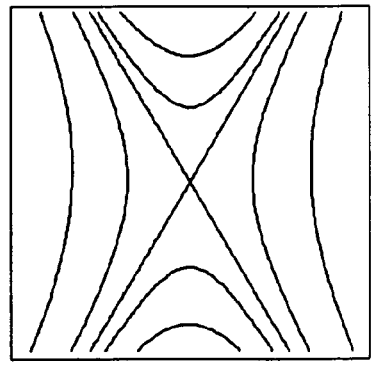

FIGS. 7a to 7c shows for two different systems equimagnitude contours (i.e., the contours along which the function is constant) computed numerically with Eqs. (9) for points in the plane OAB with function values close to that of the saddle point. A zero-thickness lens is inserted at zero distance: before the third surface of a thin-lens monochromatic triplet minimum, in which all glasses are identical, n=1.5, F/5, half-field 3 degrees (FIG. 7a); and before the third surface of a polychromatic Double Gauss system with different glasses, F/2, half-field 14 degrees (FIG. 7b). The glass of the thin lens is the same as the glass of the next lens. FIG. 7c shows the region around the saddle point O in FIG. 7b, enlarged. In FIGS. 7a to 7c the merit function is shown in black and in addition, the third-order spherical aberration is shown in gray. While general equimagnitude contours are curved, note the crossing straight lines that generate the curvature saddle point (4). Since the lines (2) and (3) do not depend on the nature of the optical function used, their plots for the third-order spherical aberration and for the merit function are fully superimposed. Note for the third-order spherical aberration the presence of a third line. The resulting triangle shows that the mathematical origin of these saddle points is related to the elliptic umbilic catastrophe.

Generating saddle points by inserting at certain surfaces concentric meniscus lenses as shown in FIG. 4d can be very useful for practical purposes. First, we take two points close to each other, but on both sides of the saddle. This can be done for instance by setting in (2) $u=c_{ref}\pm\epsilon$ (the points $P_1$ and $P_2$ in FIG. 6b) or by setting in (3) $v=c_{ref}\pm\epsilon$ (the points $P_3$ and $P_4$), where $\epsilon$ indicates a small curvature change. Then, two different local minima result from the optimization of these points. Finally, in these solutions the zero distances between surfaces can be increased to the desired values.

Often, (but not always) one of the minima resulting from curvature saddle points generated in this way is a hub. FIG. 8a shows a local minimum for a monochromatic quartet, in which the lenses have identical glasses, and which is used as a starting point. To facilitate the analysis, the thicknesses of the first two lenses are made equal, and the airspace between them is zero. (For obtaining practical results, this is not necessary.) Four saddle points have been generated by inserting successively at the first four surfaces 1, 2, 3 and 4 in FIG. 8a a thin meniscus lens of the same glass, concentric with the corresponding surface. In the eight local minima that resulted, the thickness of the inserted lens has been increased to the same value as that for the neighboring lenses. Remarkably, four of these minima, one resulting from each saddle point, turned out to be identical (the configuration shown in FIG. 8b).

For practical purposes, it is easier to increase thicknesses in the two resulting minima than in the saddle point itself. However, the four curvature saddle points continue to exist in the merit function landscape of the system shown in FIG. 8b when in them the thin-lens thickness is increased to the same value as that for the neighboring lenses. The system shown in FIG. 8b is connected to all of them. Since this system is connected to several saddle points, we call it a hub.

In the discussion above, we have analyzed the special situation when the thin meniscus was introduced in contact with another lens with the same glass.

The entire process, according to this one embodiment of the present invention, is summarized in FIG. 9a. Firstly, local optimization of a projection system is performed to obtain a starting configuration that is at a local minimum of the merit function or simply a previously known minimum system is used as the starting configuration. Then, a zero-thickness meniscus lens (or two mirror surfaces with zero distances between them) is inserted at a surface (also called a reference surface) in the local minimum starting configuration with N surfaces to construct a saddle point with MI=1 having N+2 surfaces. Next, the saddle point is perturbed (for example according to Eqs. 2, 3, 4, 5 shown above) and optimization is performed on both sides of the saddle, and the distances at the two surfaces that have been introduced are increased (i.e., the thickness of the inserted meniscus and the distance between it and the surface where it was introduced are increased, or similarly for the separation between inserted mirror surfaces), to generate two new configurations, $m_1$ and $m_2$, that are new minima in the merit function. Optionally, a pair of surfaces can then be removed from the resulting local minima to restore the original number of surfaces N. The or each resulting configuration is output, for example as a table of parameters specifying the projection system, as a computer file for use in making an actual projection system, rather than simply modeling the performance of such a system in a computer.

One of the major difficulties in conventional projection system design using global optimization is that the computing time increases significantly if the dimensionality of the optimization problem is increased. The method discussed here for finding new local minima suffers much less from this drawback. By inserting a meniscus lens (or pair of mirrors with zero separation) at different positions in a design that is a local minimum, saddle points are created and new local minima result from these saddle points. If the number of surfaces must be restored, a pair of surfaces can be removed from the resulting local minima. In common practice, inserting a lens in a system usually leads after optimization to a single local minimum. However, with the method of this embodiment of the present invention, a lens is inserted so that a saddle point is created, and then two minima result after optimization. Additionally, or alternatively, for further design modification and improvement, the better of these two can be chosen. Although in the method described above, the separation between the inserted surfaces (i.e., the thickness of the meniscus lens or the distance between the pair of mirrors) is zero, it is not necessary for the value to be precisely zero. The method can still work provided the separation is sufficiently small, such as less than about $10^{-4}$ m. The same is true of the distance between the inserted surfaces and the reference surface at which they are inserted which can be zero, or substantially zero, such as less than about $10^{-4}$ m.

In various embodiment, a method according to the present invention can be embodied as dedicated electronic hardware, or can be embodied in software, for example each step of the method being a module or subroutine of a longer piece of computer code. Where the invention is embodied in software, an embodiment of the invention can comprise a computer program executed on a computer system. Referring to FIG. 9b, the computer system 10 can be any type of computer system, but is typically a conventional personal computer executing a computer program written in any suitable language. The computer program can be stored on a computer-readable medium 12, which can be of any type, for example: a recording medium, such as a disc-shaped medium insertable into a drive of the computer system, and which can store information magnetically, optically or magneto-optically; a fixed recording medium of the computer system such as a hard drive; a solid-state computer memory, etc.

The application of the method of this embodiment of the invention to designing specific lithographic projection systems will now be described. Further variations of the method embodying the invention will be apparent from the following description, and so too will examples of lithographic projection systems embodying the invention.

Deep-UV Lithographic Refractive Projection Systems

Example 1

FIG. 10 shows a lithographic projection system (also referred to herein as a lithographic objective) having 43 surfaces (including the stop surface). The numerical aperture is about 0.56, the image height is about 11 mm, the magnification is about −0.25 and the wavelength is about 248 nm. All surfaces are substantially spherical and all 43 surface curvatures have been used as variables in the optimization.

The saddle point construction method is illustrated in detail for the second bulge. For studying the existence of hubs in the merit function space, all thicknesses of the lenses between surfaces thirty-four and thirty-nine (see FIG. 10.) have been made equal. The two distances between these lenses have also been made equal and have a small value. (However, for the practical purpose of generating optical systems the lens thickness and the axial thickness of the air space between the lenses can be kept at the initial values.) Successively, at each surface in this group a thin meniscus lens has been inserted as described above. In this way, six saddle points (MI=1) with 45 surfaces have been constructed. From each saddle point, by means of local optimization performed on each side of the saddle, two new minima have been generated. Interestingly, when the thickness of the thin meniscus is increased to the same value as that for the other lenses in the group $s_{34-39}$, six of the twelve local minima become identical (the "hub") and on one side all six saddle points that have been constructed are linked to it, as shown in FIG. 11. In this figure, the other six minima (shown after increasing the thickness of the meniscus) are denoted by $m_i$, where i indicates the surface where the meniscus has been inserted. If desired, the meniscus thickness can be increased in the corresponding saddle points $s_i$ as well (i.e., these saddle points, not shown in detail in FIG. 11, continue to exist), but the method for doing this is more elaborate and for practical purposes this is not necessary.

FIG. 11 shows a hub with six links in the network of local minima for a monochromatic lithographic objective with N+2=45 surfaces. For a better comparison, the part of the local minima where the most significant changes take place when inserting the meniscus is enlarged (encircled). The indices show the surface in the original system where an extra lens has been inserted and the new lens resulting from the meniscus is shown hatched.

In virtually all cases, the local minimum obtained via local optimization from the point $p_{1-}$ situated along the invariant line in FIG. 5 leads to the hub when increasing the thickness of the thin meniscus. $P_{1-}$ is defined as: $c_k = c_{k+1} = v$, $c_{k+2} = c_{ref}$ [i.e., Eq. (3)]

and v is selected as:

$$v = (|c_{ref}| - \epsilon) \cdot (-1)^n$$

where n=0 if $c_{ref} > 0$
n=-1 if $c_{ref} < 0$

With the meniscus still thin, a minimum which will become a hub always has a higher merit function value than the one on the other side of the saddle point, but surprisingly after adding thickness the trend is reversed. In the case shown in FIG. 11, the value of merit function of the hub is between 0.1% and 63% lower than the merit functions of $m_r$. For simplicity, in the rest of this discussion the local minima obtained after introducing thickness to the thin meniscus in the solutions reached from the saddle points will be referred to as local minima generated from the saddle points.

Similar results have also been obtained at the first bulge. Interestingly, there we have generated two hubs, each connected to three saddle points. When at the two hubs additional constraints are used to control the minimum edge thickness between lenses (between surfaces 18 and 21), they merge into a single hub.

If the number of surfaces in the design must remain unchanged, one can extract a lens (with suitable intermediate steps) at some position in the hub. For example, from the hub with 45 surfaces in FIG. 11, a single lens has been successively extracted between surfaces 34 and 41. In all cases, via local optimization the same minimum with 43 surfaces is obtained. Interestingly, this local minimum is actually the starting system.

In fact, the starting system is also a hub. To illustrate this property, from the starting system (with lenses having equal thicknesses in the second bulge) one lens has been extracted from the second bulge. A local minimum with 41 surfaces has been obtained. In the new minimum, a meniscus lens has been successively inserted at each surface between $s_{34}$ and $s_{38}$. The five constructed saddle points are linked on one side to minima, which, after adding thickness, again merge into a single hub, the starting system with 43 variables (see FIG. 12 which shows the network around the hub for the monochromatic lithographic objective with N=43 surfaces shown in FIG. 10).

When inserting a meniscus lens in a system one observes (see FIG. 11) that most changes in the configurations occur locally, there where the new lens has been introduced. Most of the surface curvatures in the rest of the system tend to remain unchanged. For increasing computational efficiency, such surfaces can be fixed during the processes of constructing saddle points and generating local minima.

Runs with a reduced number of variables (18) as mentioned above have also been performed. Interestingly, these variables are sufficient to place the local optimization in the basin of attraction of the hub. The remaining 26 surface curvatures fixed during these runs are, in fact, used only for polishing the final design.

Example 2

Constructing saddle points can be useful for design purposes. Research was performed to investigate whether by constructing saddle points, optimizing on the R-side (i.e., the side on which with the thin meniscus leads to a smaller decrease of the merit function) and then removing lenses, the number of lenses in lithographic systems can be reduced without large departures from their initial performance.

The lithographic lens presented in FIG. 13 consists of 47 spherical and aspherical surfaces, including the stop. All aspherical surfaces in the system are indicated with a thick line. The numerical aperture is about 0.85, the image height is about 14.02 mm and the magnification is about −0.25. The distortion is below about 4.2 nm per field point. Reoptimized with a merit function based on wavefront aberration and with telecentricity and distortion control, the system has a Strehl ratio of about 0.999 or higher and a wavefront aberration of about 3.67 m$\lambda$.

The work has been done in the first bulge ($B_1$) and in the second bulge ($B_2$). During the entire process, distortion and telecentricity were kept within the same limits as for the starting design. For illustrating the method, the steps in the two bulges will be described in detail.

The first bulge, $B_1$, consists of seven lenses, having spherical and aspherical surfaces. All lens thicknesses have been made equal, as well as the distances between them. A spherical meniscus has been inserted at the position indicated by arrow 1 in FIG. 13, constructing, in this way, a saddle point. Out of the two local minima connected to this saddle point, the one situated on the R-side of the saddle has been selected. From this configuration two lenses have been extracted: the lens indicated in FIG. 13 by arrow 2 (which has an aspheric surface) and the spherical lens resulting from the meniscus that has been previously introduced. An example of a strategy for extracting a lens is as follows: the thickness of the lens to be extracted and the distance between that lens and the preceding or following one are reduced in appropriate steps to zero; the surfaces of the resulting new thin lens are then made equal to the surface with which they are in contact; at this stage, the obtained thin meniscus lens can be removed without affecting the system performance. The resulting minimum (FIG. 14) has two surfaces less than the starting system shown in FIG. 13. Moreover, it has one aspheric surface (described by seven aspheric coefficients) less. The wavefront aberration is about 4.57 m$\lambda$, slightly larger than the one of the starting system, but this is also due to the fact that at this stage the thicknesses of the lenses in this bulge, as well as the axial thicknesses between them, don't yet have the correct value. The Strehl ratio (larger than about 0.998) remains comparable.

When comparing the two configurations we observe that the most significant differences appear around the region where we have inserted the meniscus and extracted the lens (FIG. 15). As in FIG. 11 the rest of the lenses remain almost unchanged. This also supports the conjecture according to which changing a limited number of variables is sufficient to place the local optimization in the basin of attraction of a local minimum for all variables.

By applying in the second bulge a procedure which is similar to the one in the first bulge (we have inserted one meniscus) we have obtained configurations that allow us to extract three lenses from the system, including the very curved one indicated in FIG. 13 by arrow 5.

The five lenses in the second bulge, $B_2$, have spherical and aspherical surfaces. All their thicknesses have been made equal. A spherical meniscus has been inserted at the position indicated by arrow 3 in FIG. 13. From the constructed saddle point two local minima have been generated via local optimization. The solution situated on the R-side of the saddle has been selected and the thickness of the thin meniscus in this system has been increased. In the resulting configuration (see FIG. 16) the two lenses indicated in FIG. 13 by arrow 4 have been transformed in one lens and then, the very curved lens indicated in the same figure by arrow 5 has been extracted, which leads to a reduced sensitivity in the system. The decrease in the number of elements has not damaged the system's performance, but slightly improved it. The average RMS wavefront aberration is about 4.46 m$\lambda$ at a Strehl ratio of about 0.999 and higher.

If the obtained configuration of N−2 lenses is compared with that of N−1 lenses, one observes that a number of surfaces have remained almost unchanged (FIG. 17). These lenses can be frozen during the process of extracting lenses and released at the final stage to polish the generated system. Most of the surfaces to be frozen can be indicated prior to the optimization process by a quasi-invariant to stabilize the optimization.

In the next stage, the two lenses indicated in FIG. 13 with arrow 6 have been merged. Finally the system has been optimized with all parameters (curvatures, aspheric coefficients and distances) used as variables.

The resulting minimum (FIG. 18) has three lenses less than the starting system shown in FIG. 13. Moreover, it has one aspheric surface (described by seven aspheric coefficients) less. Its performance (see below), in terms of wavefront aberration, distortion, telecentricity, and Strehl ratio, is slightly better than that of the starting system. The wavefront aberration is about 2.37 m$\lambda$, lower than that of the starting system. The Strehl ratio is about 0.9998, to be put to unity for all practical purposes.

The specifications and performance of the final Deep-UV lithographic objective illustrated in FIG. 18 are now presented. The lithographic objective shown in FIG. 18 has 41 spherical and aspherical surfaces (including the stop). Each aspheric surface is described by a conic constant plus higher-order coefficients of monomials. A standard aspherical surface with rotational symmetry about the z-axis can be represented as:

$$z = \frac{c(x^2 + y^2)}{1 + \sqrt{1 - (1+k)c^2(x^2+y^2)}} + \sum_{n=2}^{n_0} a_{2n}(x^2+y^2)^{2n} \quad \text{Eq. (10)}$$

where c is the curvature at the vertex of the surface, k is the conic constant and $a_{2n}$ are polynomial coefficients (n=2, ..., $n_0$), also denoted as a, b, c, etc in tables 4, 10, 16 and 21, where a is $a_4$, b is $a_6$, c is $a_8$ respectively. The values of the relevant parameters of the optical system are presented in Table 3 and 4.

TABLE 3

Optical prescription for the lithographic objective in FIG. 18. Lengths and radii are given in millimeters.

| Surface | Radius (mm) | Distance (mm) | N ref. index |
|---|---|---|---|
| Object | Infinity | 32 | 1.000302 |
| 1 | Infinity | 4.9648180901e−016 | 1.000302 |
| 2 | 898.023859654604 | 11.4782608731 | 1.560786 |
| 3 | 134.463937760492 | 9.48178051201 | 1.000300 |
| 4 | 279.589510966665 | 12.1628486499 | 1.560786 |
| 5 | 429.713386743823 | 30.5763283345 | 1.000300 |
| 6 | −133.575828304914 | 52.2609104477 | 1.560786 |
| 7 | −168.229498108882 | 1 | 1.000300 |
| 8 | −322.654424433578 | 52.1915639063 | 1.560786 |
| 9 | −332.142084551994 | 1 | 1.000300 |
| 10 | 487.536690843154 | 53.4932785237 | 1.560786 |
| 11 | −336.595124657592 | 8.83282118993 | 1.000300 |
| 12 | 208.196678465787 | 55.9584509243 | 1.560786 |
| 13 | −2623.49750843192 | 1 | 1.000300 |
| 14 | 193.30761811124 | 52 | 1.560786 |
| 15 | 155.968334943742 | 32.9455980804 | 1.000300 |
| 16 | −12881.3575310104 | 12.5915495035 | 1.560786 |
| 17 | 403.369936634196 | 38.7100608856 | 1.000300 |
| 18 | −105.74885910938 | 5.65846203479 | 1.560786 |
| 19 | 167.881505445566 | 26.2063087045 | 1.000300 |
| 20 | −163.085971837724 | 43.3797347636 | 1.560786 |
| 21 | −217.136687224511 | 7.75348256739 | 1.000300 |
| 22 | −797.722656872767 | 21.7839396346 | 1.560786 |
| 23 | 207.582687341939 | 28.5496395352 | 1.000300 |
| 24 | −1088.15829228498 | 36.4121314285 | 1.560786 |
| 25 | −181.255482926078 | 2.87340786737 | 1.000300 |
| 26 | 298.782208978124 | 31.8456070276 | 1.560786 |
| 27 | 1037.54514485231 | 35.3190829377 | 1.000300 |
| Stop | Infinity | 7.67288412877 | 1.000300 |
| 29 | 403.195003517407 | 54.0542249345 | 1.560786 |
| 30 | −3049.00018563268 | 26.0031544427 | 1.000300 |
| 31 | 1664.90725274904 | 48.7708456771 | 1.560786 |
| 32 | −306.660040565939 | 0.334832322002 | 1.000300 |
| 33 | 188.839828069829 | 46.8455217041 | 1.560786 |
| 34 | 208.117004701503 | 2.40815418959 | 1.000300 |
| 35 | 135.132628439669 | 46.3838349983 | 1.560786 |
| 36 | 396.103393693348 | 1 | 1.000300 |
| 37 | 116.187821079462 | 47.8154003025 | 1.560786 |
| 38 | 201.589370561389 | 9.00187082814 | 1.000300 |
| 39 | 536.431565230929 | 36.6317358331 | 1.560786 |
| 40 | 820.248661906301 | 3.20826206953 | 1.000300 |
| 41 | Infinity | 10 | 1.560786 |
| 42 | Infinity | 8 | 1.000302 |
| Image | Infinity | −3.198e−005 | |

TABLE 4

Aspheric coefficients that define the departure from sphericity of the surfaces.

| Nr | k | a<br>e | b<br>f | c<br>g | d |
|---|---|---|---|---|---|
| 2 | 0 | 1.827356401e−007 | −1.964723247e−011 | 2.826932271e−015 | −3.74016622e−019 |
|   |   | 3.076574013e−023 | −1.219964317e−028 | −2.296232868e−031 |   |
| 4 | 0 | 8.134674858e−008 | 1.104556698e−011 | −1.685618766e−015 | 1.87988583e−019 |
|   |   | −1.023459956e−023 | −4.912925606e−028 | 1.749013548e−031 |   |
| 17 | 0 | 7.319068222e−008 | 2.110164496e−012 | −1.231572849e−016 | 1.11183883e−019 |
|   |   | −4.827860977e−023 | 1.002154882e−026 | −1.010925070e−030 |   |
| 22 | 0 | 5.184566313e−008 | 2.219202716e−012 | 4.794557685e−017 | −2.37716357e−021 |
|   |   | 5.789862375e−026 | −5.785892172e−029 | 3.675508546e−033 |   |
| 27 | 0 | 1.322829666e−008 | −2.359107509e−013 | −7.418731240e−018 | 6.10788293e−023 |
|   |   | −6.637329327e−027 | 5.771574474e−031 | −1.659844755e−035 |   |
| 30 | 0 | 5.200370613e−009 | 3.266751776e−013 | 3.648281997e−018 | −8.12903873e−023 |
|   |   | 7.955327013e−027 | −3.788219518e−031 | 7.724948872e−036 |   |
| 39 | 0 | −9.269356549e−008 | 2.721883131e−012 | 9.611406529e−016 | −3.52824389e−020 |
|   |   | −2.306888008e−023 | 3.782079247e−027 | −2.077933409e−031 |   |

The system specifications, such as the numerical aperture (NA), image height, wavelength and magnification are shown in Table 5.

TABLE 5

| Specifications | Value |
|---|---|
| NA | 0.85 |
| Image Field | 14.02 mm |
| Total Track | 1045.6 mm |
| Wavelength | 193.368 nm |
| Magnification | −0.25 |

Table 6 presents the performance of the system shown in FIG. 18. For each field individually the shift of the center of the reference sphere, the corresponding RMS wavefront aberration value and Strehl ratio are given. The set of columns labeled "Best Composite Focus" indicates the system's performance for the field-weighted best focus.

Units of RMS are waves at about 193.4 nm. Strehl is the intensity at the peak point image as a fraction of the peak of the aberration-free image with the same vignetting and obscuration. The approximation used here is generally valid for RMS<0.1.

Finally, FIG. 19 and FIG. 20 give the optical path difference analysis and distortion analysis, respectively, of the system shown in FIG. 18.

Extreme UV Lithographic Reflective Projection Systems

Example 3

A generalized version of the saddle point construction method has also been applied to ring-field mirror systems for EUV lithography. At aspheric surfaces, saddle points are created by inserting a pair of mirrors with the same aspheric shape. The method is illustrated with the following example. Starting with the four-mirror local minimum shown in FIG. 21(*a*), we have constructed a saddle point having six mirrors,

TABLE 6

| | | Best individual focus | | | Best composite focus | | |
|---|---|---|---|---|---|---|---|
| Relative field | | Y Shift | RMS | Strehl | Y Shift | RMS | Strehl |
| X | Y | (mm) | (waves) | (mm) | (mm) | (waves) | (mm) |
| 0.0 | 0.00 | 0.000000 | 0.0008 | 1.0000 | 0.000000 | 0.0010 | 1.0000 |
| 0.0 | 0.35 | 0.000001 | 0.0019 | 1.0000 | 0.000001 | 0.0020 | 1.0000 |
| 0.0 | 0.50 | 0.000003 | 0.0014 | 1.0000 | 0.000003 | 0.0015 | 1.0000 |
| 0.0 | 0.71 | 0.000005 | 0.0019 | 1.0000 | 0.000005 | 0.0019 | 1.0000 |
| 0.0 | 0.87 | 0.000005 | 0.0026 | 1.0000 | 0.000005 | 0.0027 | 1.0000 |
| 0.0 | 0.94 | 0.000003 | 0.0028 | 1.0000 | 0.000003 | 0.0028 | 1.0000 |
| 0.0 | 1.00 | 0.000003 | 0.0028 | 1.0000 | 0.000003 | 0.0028 | 1.0000 |
| Composite RMS | | | | | | 0.00219 | | by inserting a pair of mirrors after the first surface. As mentioned earlier both new distances are zero. The new saddle point leads to two local minima in the merit function space. We observe again that one of the local minima has a much higher merit function. (Again we call this side of the saddle the hub side.) After increasing the zero distances and optimizing, the two solutions denoted $LM_1$ and $LM_2$ take the shape shown in FIG. 21(b).

FIG. 21: EUV example: a) Starting local minimum (N=4). At a numerical aperture of about 0.16, the object heights are in-between about 114 mm and about 118 mm and the magnification is about 0.25. b) EUV solutions resulting from a constructed SP at the first surface (N+2=6).

Example 4

FIG. 22 shows how six- and eight-mirror systems can be generated when starting from a local minimum with four mirrors.

The four-mirror system selected as a starting point is situated in class 9+ (further details of this class notation for mirror systems can be found in U.S. Pat. No. 6,556,648 B1) and has all surfaces spherical. All four curvatures are varied. The numerical aperture is about 0.16, the ring image position is about 29.5 mm and the magnification is about 0.25. The default CODE V merit function, based on transverse aberration, has been used for optimization. Constraints have been added to the merit function to control the telecentricity on the image side and the quasi-telecentricity on the object side.

A pair of mirrors has been successively inserted before the second and the third surface. The two mirrors have the same spherical shape as the one where they have been introduced. The axial distances between the three consecutive mirrors is zero. In this way, two saddle points with six surfaces, $s_2$ and $s_3$, have been constructed. From each saddle point, by means of local optimization, two new solutions are generated. Again, one of the solutions has a much larger merit function than the other. In order to be consistent, this side of the saddle is called the R-side. When increasing the axial distances between the three consecutive mirrors, four solutions ($m_{R2}$, $m_{S2}$, $m_{R3}$, $m_{S3}$), having new shapes, are obtained as can be observed in FIG. 22. The successive insertion of a pair of mirrors at different positions in a four-mirror system results in two saddle points, $s_2$ and $s_3$, with six surfaces.

The positions where the pairs of mirrors have been inserted have influenced the class to which the resulting solutions belong. For example, the insertion of the pair of mirrors before the second surface in the four-mirror system has resulted in two six-mirror systems ($m_{R2}$ and $m_{S2}$) situated in class 41+. In contrast, the two solutions generated from $s_2$ belong to class 37+.

Further, the two six-mirror systems ($m_{R2}$ and $m_{R3}$) situated on the R-sides of the saddles from $s_2$ and $s_3$ are used as starting points for the process of generating new saddle points in N+2 (=8) variables. Two new saddle points, $s_2$ and $s_5$, are shown in FIG. 22 and they are connected to the same 8-mirror system.

A pair of mirrors is inserted before the fifth surface in $m_{R2}$, constructing the saddle point, $s_5$, that has eight surfaces. From this saddle point, the two local minima, $m_{R5}$ and $m_{S5}$, are generated. In the same way, two solutions having eight mirrors ($m_{R2}$ and $m_{S2}$) have been generated from $m_{R3}$ with six mirrors, by inserting the pair of mirrors before the second surface. Surprisingly, on the R-side of the saddle the same solution has been detected as from $s_5$. In fact, this solution is connected in the merit function landscape to at least seven saddle points. Each of the saddle points has been obtained by successively inserting the pair of mirrors after and before each surface starting with:

the fourth surface and ending with the sixth one in $m_{R2}$ the first surface and ending with the second one in $m_{R3}$ Similarly, the two solutions that have six mirrors, $m_{R2}$ and $m_{R3}$, are connected to at least three saddle points. If at these solutions saddle points are constructed at the first, respectively third surface, new solutions having eight mirrors are generated. For instance, the insertion of the pair of mirrors before the second surface results in the two solutions illustrated in FIG. 23 a), if the pair of mirrors is inserted before the third mirror in $m_{R3}$, the two solutions shown in FIG. 23 b) are obtained.

The above examples show how the saddle point construction method can be used in the design of extreme UV projection optics. However, in order to use the systems illustrated in FIGS. 22 and 23 for practical applications, one must further optimize them to satisfy practical requirements. For example, if the eight-mirror system $m_{R5}$ in FIG. 22 is further optimized, the quasi-telecentricity, telecentricity and distortion requirements can be satisfied and the system is shown in FIG. 24. All surfaces are spherical and distortion is corrected below about 1 nm, however, the numerical aperture is still small, i.e NA=0.16.

Large changes in an EUV system lead to surprising configurations. For example, from the saddle point $s_3$, in FIG. 22, the solution with non-zero axial distances indicated as $m_{R3}$ is detected. The six-mirror system belongs to class 37+. However, when increasing distances between the three consecutive mirrors in the local minimum detected from $s_3$, the optimization leads to a different solution (see FIG. 25) if the step size used to increase the axial distances is large. In such a case, during the optimization process, the second mirror is placed above the rays reflected by the mask and collected by the first mirror. The obstruction border is violated, because the merit function does not contain a constraint to limit the optimization domain to class 37+. The resulting solution, shown in FIG. 25, belongs to class 5+.

Example 5

A further example to illustrate a method and projection system embodying the invention is now given. A four-mirror system (N=4) situated in class 6– and illustrated in FIG. 26 has been used as starting point. All surfaces are aspherical with aspheric coefficients going up to the 18-th order on each surface. The system has a numerical aperture about of 0.15 and the image height is about 23.8 mm. All chief ray angles of incidence are smaller than about 16.1°. The wavefront aberration is about 28 mλ.

The default CODE V merit function has been used for local optimization. During the process of constructing saddle points, extra constraints have been used to control the upper marginal ray leaving the mask and the chief ray leaving the last mirror to be parallel to the optical axis.

A pair of aspheric mirrors has been inserted before the third surface. From the constructed saddle point, $s_3$, two solutions (N+2=6) having the shapes illustrated in FIG. 27 were obtained.

Example 6

High-quality solutions can be obtained with the saddle point construction method. In this example, an eight-mirror system has been obtained from a six-mirror one with spherical surfaces. FIG. 28 shows the starting local minimum with N=6 spherical surfaces and a numerical aperture of about 0.16. In the starting 6-mirror configuration illustrated in FIG. 28, a pair of spherical mirrors has been inserted after the second surface. From the constructed saddle point, by means of local optimization, two solutions have been generated each having three consecutive mirrors in contact. After increasing the zero distances, the solutions have been locally optimized with all variables (curvatures, aspheric coefficients and distances) and practical constraints. In this way the two systems, $m_{R2}$ and $m_{S2}$, shown in FIG. 29 have been obtained. During the process of local optimization, the numerical aperture of the two solutions has been increased from about 0.16 to 0.4.

The minimum situated on the R-side of the saddle has converged to a solution that satisfies practical requirements: distortion smaller than 1 nm per field and Strehl ratio larger than about 0.996 with a wavefront aberration of about 10 m$\lambda$. This mirror system is shown in more detail in FIG. 30. All surfaces are aspheric and the system comprises an intermediate image between mirrors four and five. The aperture stop is situated on the second mirror. Some of the system's specifications are shown in Table 7. A detailed list of optical prescriptions is given later. During optimization, a constraint has been used to prevent mirror eight from coming into the ray path between the previous two mirrors. However, in the last cycles of the optimization, the freedom of obstruction constraint has been inactive. The final design is unobstructed. The angle of incidence of the chief ray at the mask takes a value of approximately 6.3°. At the wafer side the system is telecentric, i.e., the chief ray is perpendicular to the image plane. For coating related reasons, the angles of incidence of the chief ray at each surface have been kept smaller than about 26°, five of them below about 15°, as can be seen in Table 8.

TABLE 7

Specification for the EUV mirror system, $m_{R2}$, presented in FIGS. 29 and 30.

| Specifications | Value |
| --- | --- |
| NA | 0.4 |
| Field | 114 ... 118 mm |
| Wavelength | 13.4 nm |
| Magnification | 0.25 |
| Distortion | <1 nm |
| Strehl ratio | >0.996 |
| RMS Wavefront aberration | 10 m$\lambda$ |

TABLE 8

Chief ray angles of incidence and the angle of incidence variation at each surface of the EUV mirror system presented in FIG. 30

| Mirror | Angle | Angular spread |
| --- | --- | --- |
| 1 | 15° | 0.26° |
| 2 | 23.8° | 2.06° |
| 3 | 15° | 1.01° |
| 4 | 8.3° | 3.66° |
| 5 | 10.75° | 1.16° |
| 6 | 25.72° | 0.43° |
| 7 | 15.63° | 9.18° |
| 8 | 5.86° | 1.92° |

FIG. 30 shows the configuration of the eight-mirror projection system discussed in Example 6. All eight mirrors are aspherical and the values of the parameters describing the system are given in Tables 9 and 10

TABLE 9

Parameters describing the mirrors that form the configuration in FIG. 30 and the axial distances between them

| Surface | Radius (mm) | Distance (mm) |
| --- | --- | --- |
| Object | Infinity | 500.8243 |
| 1 | −412.8448 | −145.5591 |
| Stop | −207.5412 | 205.9176 |
| 3 | −600.5993 | −318.9442 |
| 4 | −6.8944e+004 | 610.0009 |
| 5 | −708.809 | −228.2049 |
| 6 | −1785.61 | 244.5 |
| 7 | 279.5399 | −229.519 |
| 8 | 284.0269 | 250.0008 |
| Image | Infinity | 5.6e−007 |

TABLE 10

Values of the aspheric coefficients

| Nr | k | a | b | c | d | e |
| --- | --- | --- | --- | --- | --- | --- |
| 1 | −1 | −4.7933e−009 | 4.1498e−014 | −1.4112e−019 | −9.3179e−024 | 1.9103e−028 |
| Stop | −1 | −9.7923e−009 | 1.3794e−012 | 1.3993e−016 | 9.7324e−020 | — |
| 3 | −1 | −3.0962e−009 | −8.41e−016 | −3.9728e−020 | −8.281e−025 | 1.0759e−029 |
| 4 | −1 | −4.1446e−009 | 2.2188e−014 | −4.1285e−018 | −1.162e−022 | −2.0614e−027 |
| 5 | −1 | −1.6868e−009 | 9.5153e−015 | −1.2393e−019 | 5.0798e−025 | — |
| 6 | −1 | −7.4658e−009 | −2.3282e−013 | 9.6627e−018 | −3.0365e−022 | 3.4264e−027 |
| 7 | −1 | 9.0763e−008 | −2.0467e−012 | 3.3919e−016 | 1.1278e−020 | −5.5313e−025 |
| 8 | −1 | 5.7961e−009 | 3.9097e−014 | 3.3856e−019 | 2.477e−024 | 5.5432e−029 |

The system specifications, such as the numerical aperture (NA), image height, wavelength and magnification, of the system of FIG. 30 are shown in Table 11.

TABLE 11

| Specifications | Value |
| --- | --- |
| NA | 0.4 |
| Image Field | 29.5 mm |
| Total Track | 889 mm |
| Wavelength | 13.4 nm |
| Magnification | 0.25 |

Table 12 presents the performance of the system shown in FIG. 30 in terms of shift of the center of the reference sphere, RMS wavefront aberration value and Strehl ratio.

TABLE 12

| Relative field | | Best individual focus | | | Best composite focus | | |
| --- | --- | --- | --- | --- | --- | --- | --- |
| X | Y | Y Shift (mm) | RMS (waves) | Strehl (mm) | Y Shift (mm) | RMS (waves) | Strehl (mm) |
| 0.0 | 0.97 | 0.000003 | 0.0101 | 0.996 | 0.000003 | 0.0102 | 0.996 |
| 0.0 | 0.98 | 0.000001 | 0.0106 | 0.996 | 0.000001 | 0.0111 | 0.995 |
| 0.0 | 1.00 | 0.000000 | 0.0087 | 0.997 | 0.000000 | 0.0089 | 0.997 |
| Composite RMS | | | | | | 0.01012 | |

Units of RMS are waves at about 13.4 nm. Strehl is the intensity at the peak point image as a fraction of the peak of the aberration-free image with the same vignetting and obscuration. The approximation used here is generally valid for RMS<0.1.

Finally, FIG. 31 and FIG. 32 give the distortion analysis and optical path difference analysis, respectively, of the system shown in FIG. 30.

Example 7

FIG. 33 shows the results of a network computation for a projection system with six mirrors. Saddle points are indicated by the letter s, and minima are indicted the letter m, and the subsequent number gives the merit function value for that configuration. The system that corresponds to the best minimum in FIG. 33 (m8.77179, shown at the top) has been optimized, with all variables and using practical requirements. The result is shown in FIG. 34 and some of the system's specifications and performances are shown in Tables 13 to 17. All surfaces are aspheric. The aperture stop is situated at the second mirror. Distortion is kept below about 1 nm per field position. The system is unobstructed. The angle of incidence of the chief ray at the mask takes a value of approximately 4.4°. At the wafer side the system is telecentric, i.e., the chief ray is perpendicular to the image plane. For compatibility with multilayer mirrors, the angles of incidence of the chief ray at each surface ("Angle" in Table 14.) have been kept smaller than about 20°, five of them below 13°.

TABLE 13

| Specifications | Value |
| --- | --- |
| NA | 0.25 |
| Field | 28.5 ... 29.5 mm |
| Wavelength | 13 nm |
| Magnification | 0.25 |
| Distortion | <1 nm |
| Strehl ratio | >0.986 |
| RMS Wavefront aberration | 16 mλ |

TABLE 14

| Mirror | Angle | Angular spread |
| --- | --- | --- |
| 1 | 12.17° | 0.93° |
| 2 | 20° | 2.75° |
| 3 | 11.62° | 0.98° |
| 4 | 6.88° | 1.86° |
| 5 | 12.88° | 6.96° |
| 6 | 4.39° | 0.84° |

The EUV projection system shown in FIG. 34 has been designed to work at a wavelength of about 13 nm. The total track is about 1030 mm. The system's specifications in terms of surface radii and distances between mirrors are given in Table 15. All surfaces are aspheric and the values of the aspheric coefficients are given in Table 16.

TABLE 15

| Reflective surface | Radius (mm) | Distance (mm) |
| --- | --- | --- |
| Object | Infinity | 629.76 |
| 1 | −502.31 | −192.98 |
| Stop | −443.57 | 496.91 |
| 3 | −1194.91 | −590.2 |
| 4 | 1174.92 | 638.2 |
| 5 | 252.84 | −304.93 |
| 6 | 379.33 | 353.24 |
| Image | Infinity | 0 |

TABLE 16

| Nr. | k | a | b | c | d |
| --- | --- | --- | --- | --- | --- |
| 1 | −1.0 | −8.10492e−10 | −2.12812e−15 | 2.00734e−20 | −2.91712e−25 |
| Stop | −1.0 | 2.52722e−08 | 1.84295e−12 | 7.68723e−17 | 1.92816e−20 |
| 3 | −1.0 | 3.89102e−11 | −1.20482e−15 | 1.71841e−20 | −1.06109e−25 |
| 4 | −1.0 | −8.80709e−10 | 4.52180e−14 | −8.11355e−19 | 5.09977e−24 |
| 5 | −1.0 | 4.19699e−08 | 1.54006e−12 | 5.41277e−17 | 6.47025e−21 |
| 6 | −1.0 | 2.41059e−09 | 8.97226e−15 | 4.12952e−20 | 2.80010e−25 |

The performance of the system presented above is shown in Table 17. For each field individually, the shift of the center of the reference sphere, the corresponding RMS wavefront aberration value and the Strehl ratio are given. The composite wavefront aberration is 16 mλ and the Strehl ratio is larger than 0.986.

TABLE 17

| Relative field | | Best individual focus | | | Best composite focus | | |
|---|---|---|---|---|---|---|---|
| X | Y | Y Shift (mm) | RMS (waves) | Strehl (mm) | Y Shift (mm) | RMS (waves) | Strehl (mm) |
| 0.0 | 0.97 | 0.000001 | 0.0114 | 0.995 | 0.000001 | 0.0144 | 0.992 |
| 0.0 | 0.98 | −0.000002 | 0.0111 | 0.995 | −0.000002 | 0.0192 | 0.986 |
| 0.0 | 1.00 | 0.000001 | 0.0115 | 0.995 | 0.000001 | 0.0145 | 0.992 |
| Composite RMS | | | | | | 0.01626 | |

Increasing the numerical aperture of the system shown in FIG. 34 to a value of about 0.3 results in the system of FIG. 35. However, the imaging performance in terms of wavefront aberration and Strehl ratio becomes poor, but could be improved with more local optimization of the obtained solution.

Example 8

During the local optimization process, the system has the tendency to change classes. In order to keep the solution in class 45+, the freedom of obscuration constraint is necessary. When this constraint is absent, the third mirror interferes in the ray path between the fourth and the fifth mirrors and the system crosses the boundary line between class 45+ and class 41+.

Further optimization of the newly obtain configuration leads to a six-mirror system (see FIG. 36) situated in class 41+ that has a numerical aperture of about 0.3 (see Table 18). The design requirements, in terms of distortion, telecentricity at the wafer, quasi-telecentricity at the mask and freedom of obscuration, are satisfied. The angles of incidence of the chief ray at each surface ("Angle" in Table 19) are smaller than about 15°, four of them below about 7°. The rms wavefront aberration is smaller than about 31 mλ. Additional information about this design is given below.

TABLE 18

| Specifications | Value |
|---|---|
| NA | 0.3 |
| Field | 28.5 . . . 29.5 mm |
| Wavelength | 13.5 nm |
| Magnification | 0.25 |
| Distortion | <1 nm |
| Strehl ratio | 0.944 |
| RMS Wavefront aberration | 31 mλ |

TABLE 19

Chief ray angles of incidence for the EUV mirror system presented in FIG. 36

| Mirror | Angle | Angular spread |
|---|---|---|
| 1 | 6.42° | 4.26° |
| 2 | 6.62° | 1.55° |
| 3 | 14.63° | 4.59° |
| 4 | 4.36° | 2.23° |
| 5 | 11.03° | 7.86° |
| 6 | 4.07° | 2.14° |

Some of the specifications and the performance of the EUV six-mirror projection system illustrated in FIG. 36 are given below.

FIG. 36 shows the EUV projection system with a numerical aperture of about 0.3. The system has been designed to work at a wavelength of about 13.5 nm. The total track is about 1036.2 mm. The system specifications in terms of radii and distances between mirrors are given in Table 20. All surfaces are aspheric and the values of the aspheric coefficients are given in Table 21.

TABLE 20

Optical prescription for the EUV six-mirror system showed in FIG. 36

| Reflective surface | Radius (mm) | Distance (mm) |
|---|---|---|
| Object | Infinity | 599 |
| 1 | −11649.62807 | −420.38 |
| Stop | 756.22 | 450.22 |
| 3 | 382.51 | −397.23 |
| 4 | 358.48 | 786.6 |
| 5 | 368.18 | −328.61 |
| 6 | 401.58 | 346.62 |
| Image | Infinity | 0 |

TABLE 21

Values of the aspheric coefficients that characterize the surfaces of the six-mirror system in FIG. 36.

| Nr. | K | a | b | c | d | e |
|---|---|---|---|---|---|---|
| 1 | −1.0 | 1.27808e−09 | −7.70834e−15 | 1.08806e−19 | 1.44611e−24 | −1.32003e−28 |
| Stop | −1.0 | 1.28858e−10 | −3.04390e−15 | −1.03997e−19 | 7.79798e−25 | — |
| 3 | −1.0 | 4.99689e−09 | −7.16941e−14 | 2.40645e−17 | −2.97337e−21 | 1.48591e−25 |
| 4 | −1.0 | −2.83190e−08 | 6.48095e−13 | −6.87654e−18 | 2.16269e−23 | 8.53426e−29 |
| 5 | −1.0 | 1.56374e−08 | 4.00468e−13 | −1.32774e−18 | 3.49147e−22 | −2.61910e−25 |
| 6 | −1.0 | 2.13882e−09 | 7.73607e−15 | 3.27542e−20 | 3.54263e−25 | −1.24655e−30 |

The performance of the system, shown in FIG. 36, in terms of wavefront aberration and Strehl ratio, is given in Table 22. For each field individually, the shift of the center of the reference sphere is also shown.

TABLE 22

The performance of the EUV mirror system shown in FIG. 36.

| Relative field | | Best individual focus | | | Best composite focus | | |
|---|---|---|---|---|---|---|---|
| X | Y | Y Shift (mm) | RMS (waves) | Strehl (mm) | Y Shift (mm) | RMS (waves) | Strehl (mm) |
| 0.0 | 0.97 | −0.000007 | 0.0363 | 0.949 | −0.000007 | 0.0380 | 0.944 |
| 0.0 | 0.97 | −0.000003 | 0.0290 | 0.967 | −0.000003 | 0.0298 | 0.966 |
| 0.0 | 0.98 | −0.000001 | 0.0230 | 0.979 | −0.000001 | 0.0271 | 0.971 |
| 0.0 | 0.99 | 0.000001 | 0.0249 | 0.976 | 0.000001 | 0.0249 | 0.976 |
| 0.0 | 1.00 | −0.000002 | 0.0348 | 0.953 | −0.000002 | 0.0364 | 0.949 |
| Composite RMS | | | | | 0.03165 | | |

In the drawings of mirror systems herein, such as FIG. 36, the mirrors are shown purely schematically, such that, for example, in the real system the extreme rays would not be obscured by the sixth mirror.

Although specific reference can be made in this text to the use of lithographic apparatus in the manufacture of ICs, it should be understood that the lithographic apparatus described herein can have other applications, such as the manufacture of integrated optical systems, guidance and detection patterns for magnetic domain memories, flat-panel displays, liquid-crystal displays (LCDs), thin film magnetic heads, etc. The skilled artisan will appreciate that, in the context of such alternative applications, any use of the terms "wafer" or "die" herein can be considered as synonymous with the more general terms "substrate" or "target portion", respectively. The substrate referred to herein can be processed, before or after exposure, in for example a track (a tool that typically applies a layer of resist to a substrate and develops the exposed resist), a metrology tool and/or an inspection tool. Where applicable, the disclosure herein can be applied to such and other substrate processing tools. Further, the substrate can be processed more than once, for example in order to create a multi-layer IC, so that the term substrate used herein can also refer to a substrate that already contains multiple processed layers.

The terms "radiation" and "beam" used herein encompass all types of electromagnetic radiation, including ultraviolet (UV) radiation (e.g., having a wavelength of or about 365, 355, 248, 193, 157 or 126 nm) and extreme ultraviolet (EUV) radiation (e.g., having a wavelength in the range of 5-20 nm), as well as particle beams, such as ion beams or electron beams.

The term "lens", where the context allows, can refer to any one or combination of various types of optical components, including refractive, reflective, magnetic, electromagnetic and electrostatic optical components.

While specific embodiments of the invention have been described above, it will be appreciated that the invention can be practiced otherwise than as described. For example, the invention can take the form of a computer program containing one or more sequences of machine-readable instructions describing a method as disclosed above, or a data storage medium (e.g., semiconductor memory, magnetic or optical disk) having such a computer program stored therein.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections can set forth one or more, but not all exemplary embodiments of the present invention as contemplated by the inventor(s), and thus, are not intended to limit the present invention and the appended claims in any way.

The invention claimed is:

1. A method of designing a projection system for a lithographic projection apparatus, comprising:
   obtaining a projection system starting configuration comprising a plurality of surfaces and having a merit function value corresponding to a local minimum in a merit function space;
   inserting two additional surfaces at a reference surface in the starting configuration, with a separation between the additional surfaces and between the additional surfaces and the reference surface, with the optical material between the additional surfaces being substantially the same as that at the reference surface and with the curvatures of the two additional surfaces being substantially the same as the curvature of the reference surface to generate a saddle point configuration of a projection system corresponding to a saddle point in merit function space, wherein the saddle point has a Morse Index value of 1;
   perturbing the saddle point configuration and performing optimization on at least one side of the saddle point to obtain a new projection system configuration having a merit function value corresponding to a local minimum in the merit function space; increasing the separation between the two inserted surfaces and between the inserted surfaces and the reference surface at which they were inserted; and outputting the resulting projection system configuration.

2. The method according to claim 1, wherein the saddle point has a Morse Index value of 1.

3. The method according to claim 1, wherein the separation between the additional surfaces and between the additional surfaces and the reference surface is less than about $10^{-4}$ m.

4. The method according to claim 1, wherein the separation between the additional surfaces and between the additional surfaces and the reference surface is substantially zero.

5. The method according to claim 1, wherein two new projection system configurations are obtained by performing optimization on two sides of the saddle point, and the optimized configuration which, after increasing the separation between the two inserted surfaces, has the lower merit function value of the two configurations is selected as the resulting projection system configuration to be output.

6. The method according to claim 1, wherein the projection system comprises a plurality of lenses.

7. The method according to claim 6, wherein the two additional surfaces comprise the surfaces of a meniscus lens.

8. The method according to claim 1, for designing a projection system for a lithographic projection apparatus using a beam of radiation with wavelength shorter than about 300 nm.

9. The method according to claim 1, wherein the projection system comprises a plurality of mirrors.

10. The method according to claim 9, wherein the two additional surfaces comprise a pair of reflective surfaces.

11. The method according to claim 1, for designing a projection system for a lithographic projection apparatus using a beam of radiation with wavelength shorter than about 30 nm.

12. The method according to claim 1, further comprising removing at least one lens or two reflective surfaces from a projection system configuration obtained after performing optimization on the saddle point configuration.

13. The method according to claim 12, comprising performing further optimization of the configuration with the at least one lens or two reflective surfaces removed.

14. The method according to claim 1, comprising performing further optimization of the configuration after increasing the separation between the two inserted surfaces and between the inserted surfaces and the reference surface at which they were inserted.

15. A method comprising iterating the method as defined in claim 1, but inserting the two additional surfaces at a different reference surface in the projection system configuration at each iteration.

16. The method according to claim 1, wherein the method is computer-implemented.

17. A lithographic apparatus comprising:
  an illumination system configured to condition a radiation beam;
  a support constructed to support a patterning device, the patterning device being capable of imparting the radiation beam with a pattern in its cross-section to form a patterned radiation beam;
  a substrate table constructed to hold a substrate; and
  a projection system designed using the method of claim 1 and configured to project the patterned radiation beam onto a target portion of the substrate.

18. A device manufacturing method comprising projecting a patterned beam of radiation onto a target portion of a layer of radiation-sensitive material on a substrate using a projection system designed using the method according to claim 1.

19. A device manufactured in accordance with the method of claim 18.

20. A computer program comprising computer-executable code that when executed on a computer system causes the computer system to perform a method according to claim 1.

21. A computer-readable medium storing a computer program according to claim 20.

* * * * *

UNITED STATES PATENT AND TRADEMARK OFFICE
CERTIFICATE OF CORRECTION

PATENT NO. : 7,714,307 B2  
APPLICATION NO. : 11/517578  
DATED : May 11, 2010  
INVENTOR(S) : Florian Bociort Page 1 of 1

It is certified that error appears in the above-identified patent and that said Letters Patent is hereby corrected as shown below:

In claim 2, column 36 and line 49, please delete claim 2 and replace with "2. Cancelled"

Signed and Sealed this

Thirteenth Day of July, 2010

David J. Kappos  
*Director of the United States Patent and Trademark Office*